US011150196B2

(12) United States Patent
Endou et al.

(10) Patent No.: US 11,150,196 B2
(45) Date of Patent: Oct. 19, 2021

(54) JOINING PROCESS LINE MONITORING SYSTEM

(71) Applicants: HITACHI, LTD., Tokyo (JP); DAIKIN INDUSTRIES, LTD., Osaka (JP)

(72) Inventors: Hisashi Endou, Tokyo (JP); Masanori Miyagi, Tokyo (JP); Hiroshi Yoshikawa, Tokyo (JP); Toshihiro Yamada, Tokyo (JP); Nobuhiro Kakeno, Tokyo (JP); Yasunori Hama, Osaka (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/644,155

(22) PCT Filed: Aug. 30, 2018

(86) PCT No.: PCT/JP2018/032072
§ 371 (c)(1),
(2) Date: Mar. 3, 2020

(87) PCT Pub. No.: WO2019/058916
PCT Pub. Date: Mar. 28, 2019

(65) Prior Publication Data
US 2021/0063316 A1 Mar. 4, 2021

(30) Foreign Application Priority Data
Sep. 21, 2017 (JP) .............................. JP2017-181041

(51) Int. Cl.
*G01N 21/892* (2006.01)
*B23K 31/12* (2006.01)
*G01N 25/72* (2006.01)

(52) U.S. Cl.
CPC ......... *G01N 21/892* (2013.01); *B23K 31/125* (2013.01); *G01N 25/72* (2013.01)

(58) Field of Classification Search
CPC ...... B23K 9/0956; B23K 9/0953; B23K 9/32; B23K 9/095; B23K 9/322; B23K 37/00;
(Continued)

(56) References Cited

U.S. PATENT DOCUMENTS

| 4,491,718 A * | 1/1985 | Cook ................... B23K 9/0216 219/124.22 |
| 10,380,911 B2 * | 8/2019 | Hsu ........................ G09B 19/00 |

(Continued)

FOREIGN PATENT DOCUMENTS

| JP | H06-262345 A | 9/1994 |
| JP | H10-137929 A | 5/1998 |

(Continued)

*Primary Examiner* — Michael P Stafira
(74) *Attorney, Agent, or Firm* — Procopio, Cory, Hargreaves & Savitch LLP

(57) ABSTRACT

The disclosure provides a joining process line monitoring system capable of preventing joining quality deterioration and operation delay. A joining process line monitoring system 100 includes a joining phenomenon data acquisition part 111 configured to acquire a joining phenomenon of a joining subject member as phenomenon data; an operation state data acquisition part 112 configured to acquire a joining operation state of the joining subject member as operation state data; an evaluation data calculation unit 120 configured to perform time synchronization of the acquired phenomenon data and the acquired operation state data, and associate the acquired phenomenon data and the acquired operation state data with each joining operation location, so as to calculate evaluation data; a difference data extraction unit 130 configured to extract a difference between the evaluation data and reference data set in advance as difference data; an abnormal location determination unit 140 that determines that a portion having a large difference from the joining phenomenon is an abnormal location; and a presentation unit
(Continued)

150 configured to present the abnormal location of a joining portion of the joining subject member based on the difference data.

6 Claims, 22 Drawing Sheets

(58) Field of Classification Search
CPC ........ B23K 9/10; B23K 31/125; B23K 9/126; B23K 37/006; B23K 9/1062; B23K 9/16; B23K 31/00; B23K 9/282; B23K 9/287; B23K 37/0461; B23K 9/00; B23K 10/006; B23K 37/0435; B23K 9/12; B23K 9/30; B23K 10/00; B23K 11/252; B23K 11/253; B23K 31/02; B23K 31/12; B23K 35/0261; B23K 37/04; B23K 37/047; B23K 9/1087; B23K 9/124; B23K 9/167; B23K 9/173; B23K 9/235; B23K 9/09; B23K 9/1006; B23K 2101/001; B23K 20/122; B23K 20/1225; B23K 20/124; B23K 1/0018; B23K 11/0013; B23K 15/0006; B23K 15/0093; B23K 1/008; B23K 2101/26; B23K 2103/14; B23K 26/32; B23K 35/0244; B23K 9/23; B23K 11/004; B23K 11/34; B23K 2103/08; B23K 2103/10; B23K 2103/26; B23K 26/342; B23K 11/002; B23K 11/10; B23K 15/00; B23K 15/0033; B23K 15/0046; B23K 15/0086; B23K 1/0004; B23K 1/19; B23K 1/20; B23K 2101/18; B23K 2103/02; B23K 2103/04; B23K 26/034; B23K 26/0673; B23K 26/21; B23K 35/3033; B23K 35/3046; B23K 9/044; B23K 11/0033; B23K 11/314; B23K 2103/12; B23K 2103/18; B23K 2103/42; B23K 26/0096; B23K 26/032; B23K 26/142; B23K 26/1462; B23K 35/24; B23K 37/06; B23K 9/0026; B23K 9/0213; B23K 9/0216; B23K 9/0354; B23K 9/296; B23K 9/324; G01N 21/94; G01N 2021/8812; G01N 2021/8835; G01N 21/8422; G01N 21/8806; G01N 21/93; G01N 25/72; G01N 15/1475; G01N 2015/0073; G01N 2015/008; G01N 2015/1006; G01N 2015/1486; G01N 2021/8472; G01N 2033/0003; G01N 2035/00138; G01N 2035/00148; G01N 2035/00237; G01N 2035/00306; G01N 2035/00326; G01N 2035/00356; G01N 2035/00366; G01N 2035/00425; G01N 2035/00435; G01N 2035/00495; G01N 2035/00633; G01N 2035/0449; G01N 2035/0474; G01N 2035/0486; G01N 2035/0491; G01N 2035/0493; G01N 2035/0494; G01N 21/25; G01N 21/27; G01N 21/3554; G01N 21/359; G01N 21/88; G01N 2201/024; G01N 2201/04; G01N 2201/12; G01N 2291/0422; G01N 29/043; G01N 29/34; G01N 33/5005; G01N 33/54306; G01N 33/54313; G01N 33/54366; G01N 33/56983; G01N 33/62; G01N 33/6827; G01N 33/80; G01N 33/92; G01N 35/00; G01N 35/00029; G01N 35/00069; G01N 35/00623; G01N 35/00871; G01N 35/0092; G01N 35/026; G01N 35/04; G01N 35/10; G01N 35/1009; G01N 35/1011; G01N 35/1065; G01N 35/1072; G01N 2291/0258; G01N 2291/02854; G01N 2291/0289; G01N 2291/044; G01N 2291/106; G01N 2291/2694; G01N 27/82; G01N 29/04; G01N 29/07; G01N 29/223; G01N 29/2468; G01N 29/28; G01N 29/326; G01N 29/46; G01B 17/025; G01B 11/0616; G01B 11/24; G01B 11/303; G01B 17/06; G01B 17/08; G01B 7/105; G01J 3/50

See application file for complete search history.

(56) References Cited

U.S. PATENT DOCUMENTS

2016/0288236 A1* 10/2016 Becker ................ B23K 9/0953
2016/0314860 A1* 10/2016 Kamo .................... B23K 26/21

FOREIGN PATENT DOCUMENTS

| JP | H11-151573 A | 6/1999 |
|----|--------------|--------|
| JP | 2001-071140 A | 3/2001 |
| JP | 2003-080394 A | 3/2003 |
| JP | 2006-171184 A | 6/2006 |
| JP | 2015-155103 A | 8/2015 |

* cited by examiner

[FIG. 1(a)]
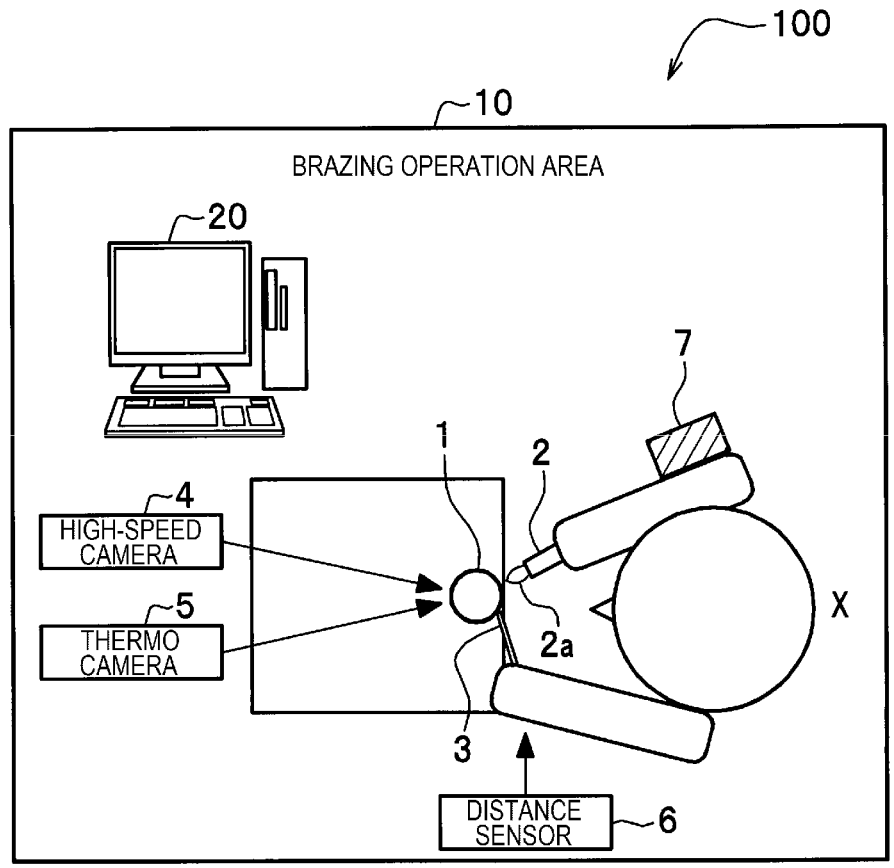
[FIG. 1(b)]
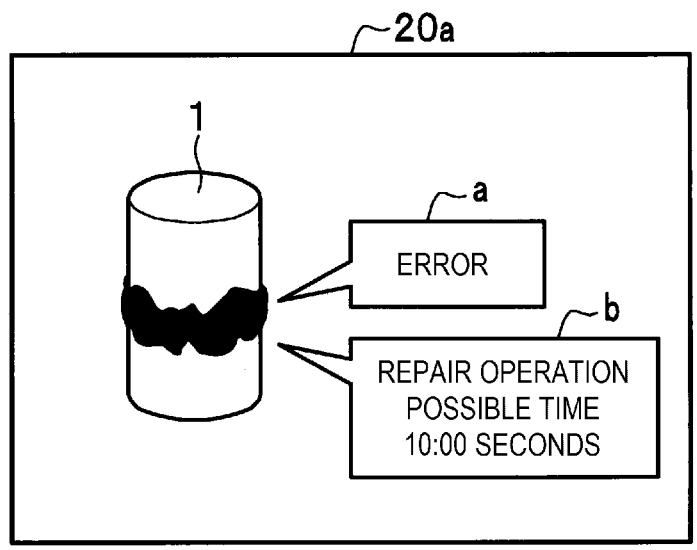

[FIG. 2]
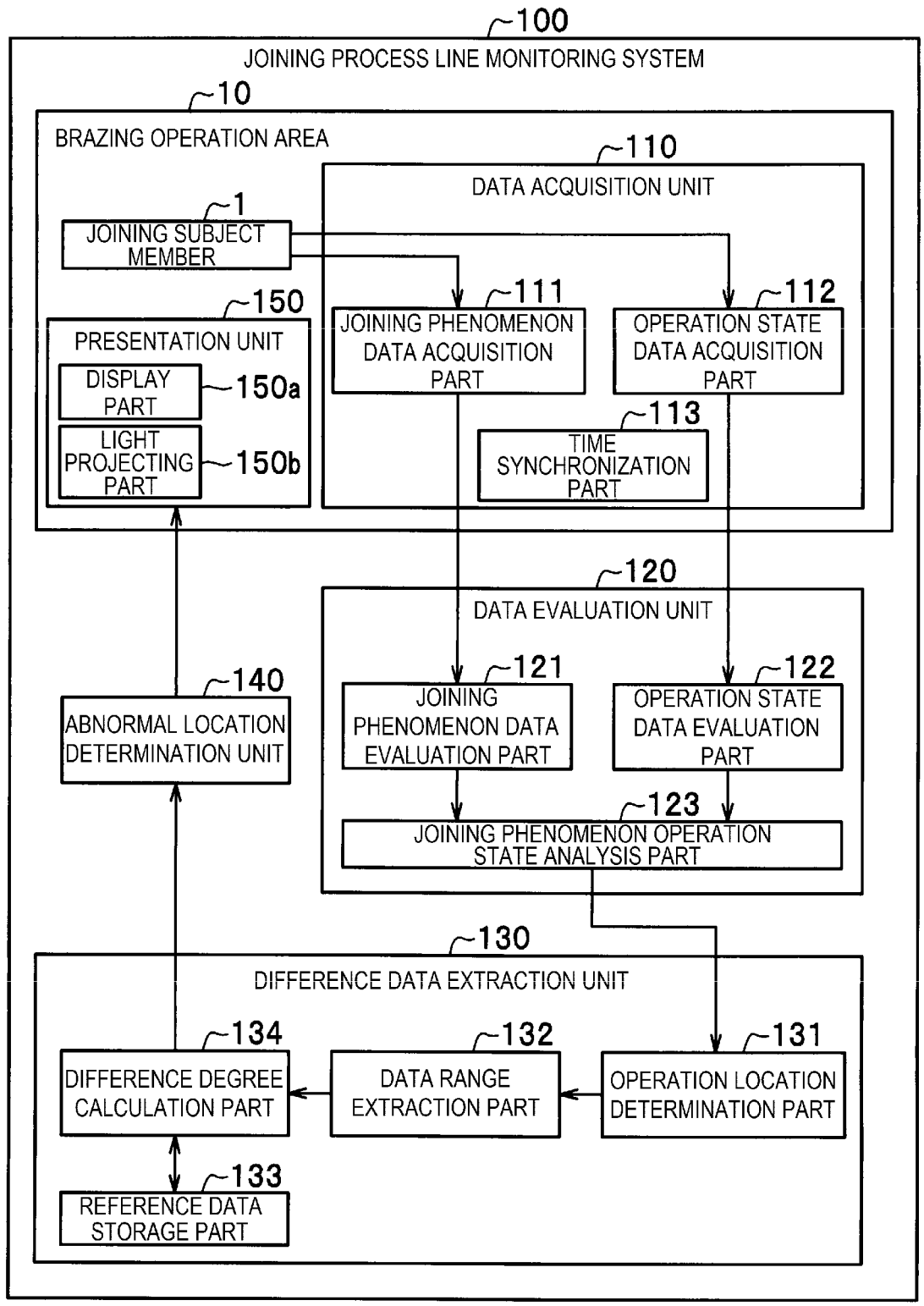

[FIG. 3(a)]
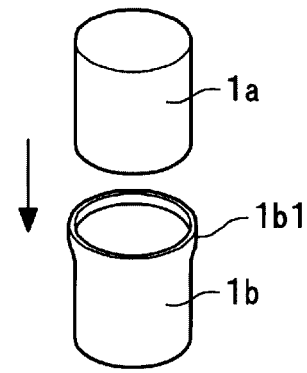
[FIG. 3(b)]
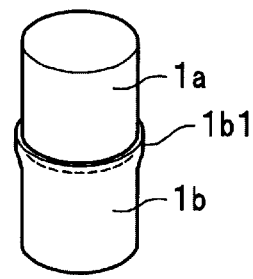
[FIG. 3(c)]
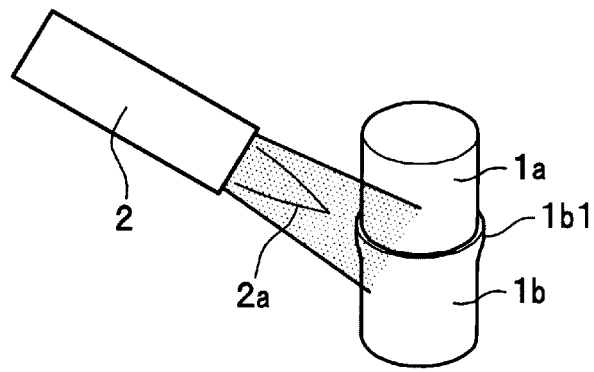

[FIG. 3(d)]
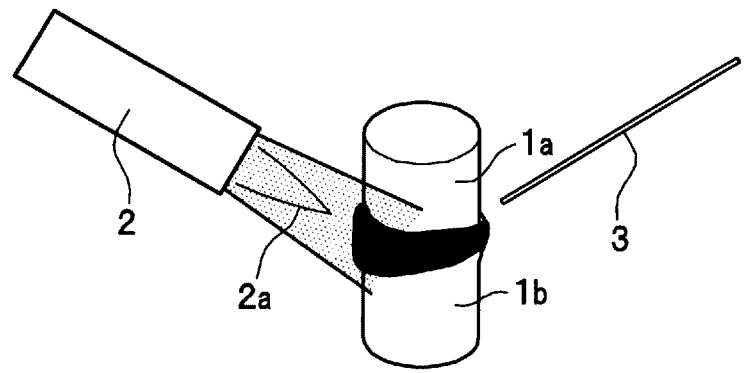
[FIG. 4(a)]
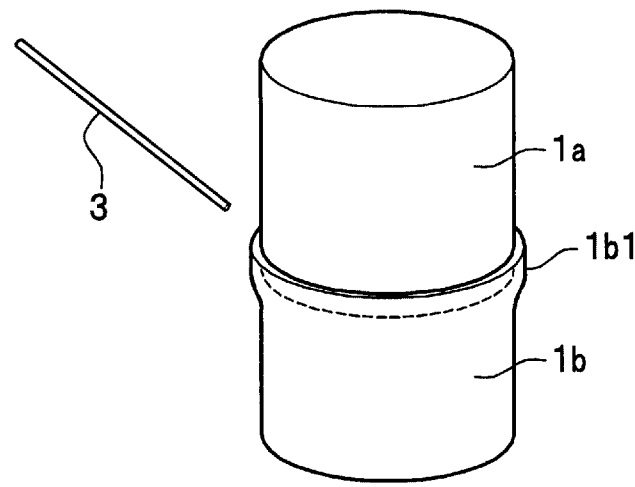
[FIG. 4(b)]
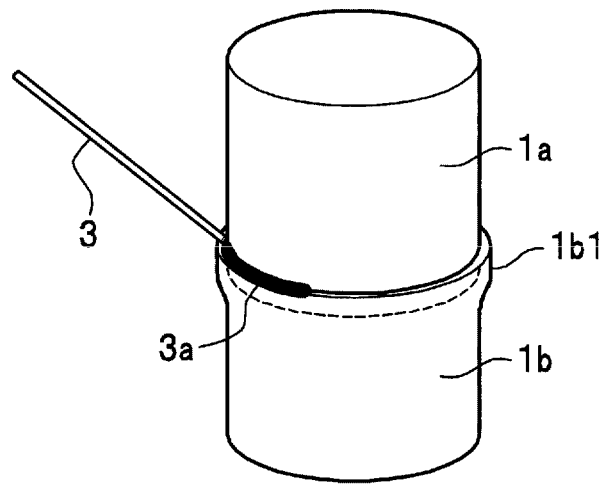

[FIG. 4(c)]
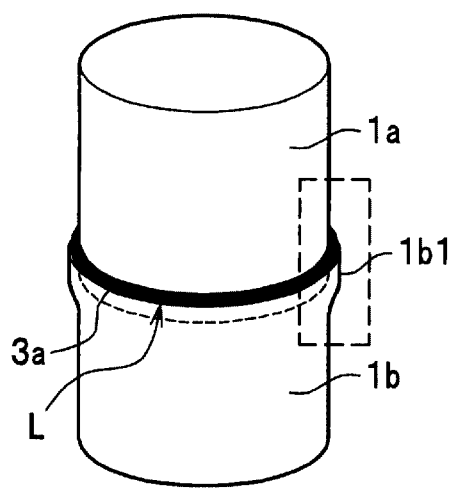
[FIG. 4(d)]
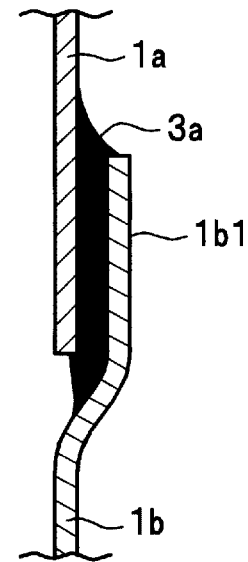
[FIG. 5(a)]
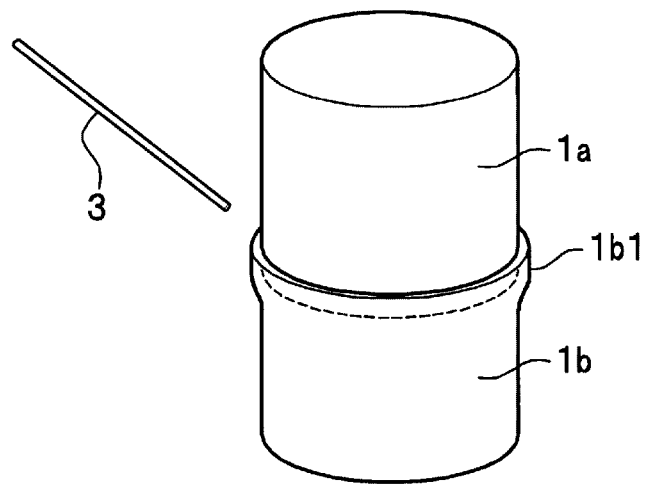

[FIG. 5(b)]
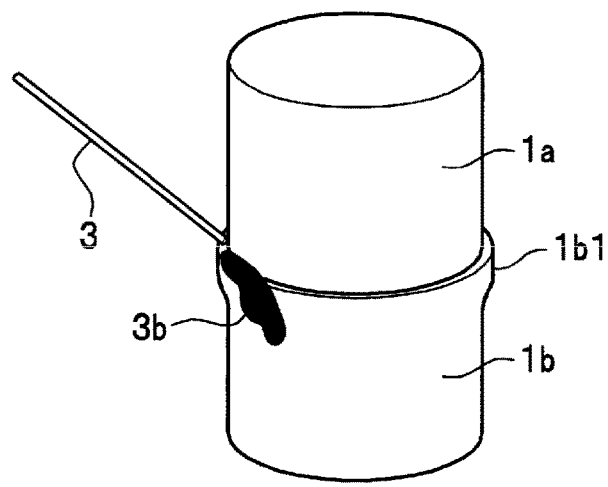
[FIG. 5(c)]
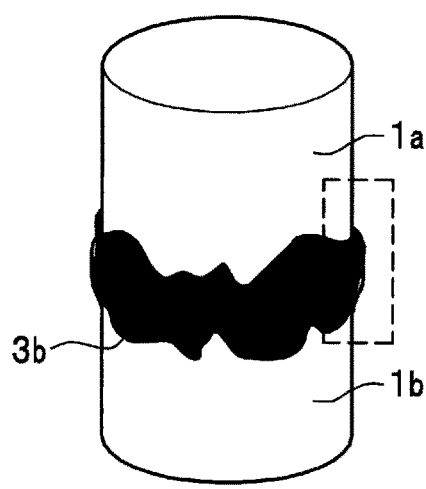
[FIG. 5(d)]
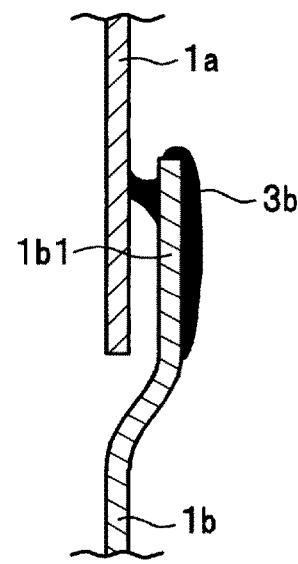

[FIG. 6(a)]
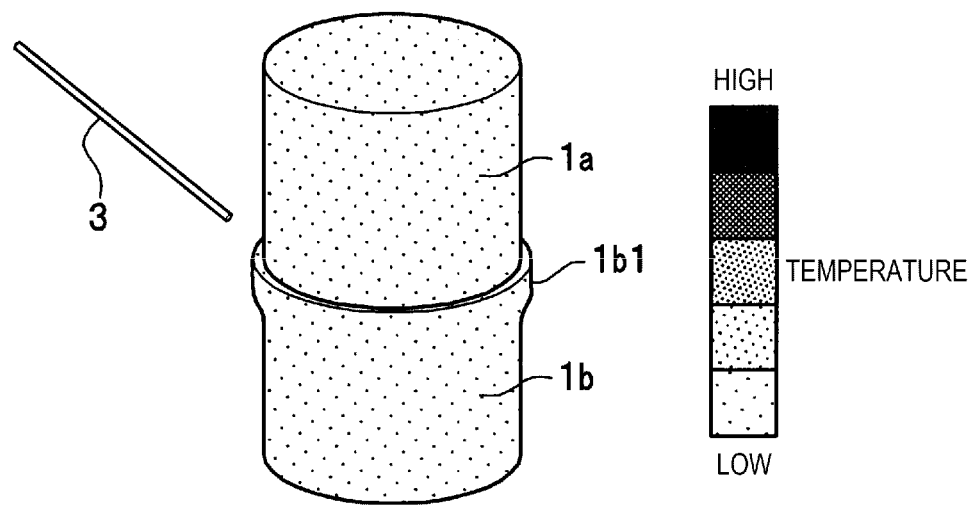
[FIG. 6(b)]
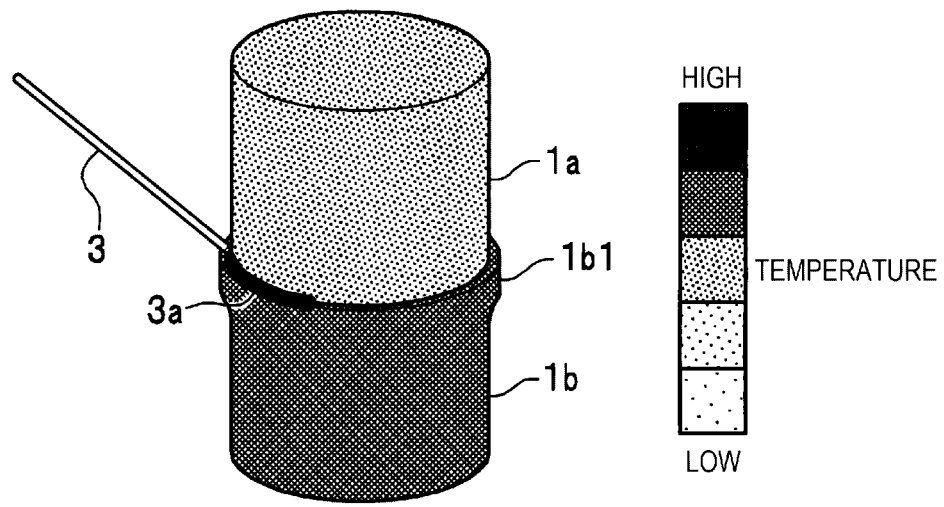

[FIG. 6(c)]
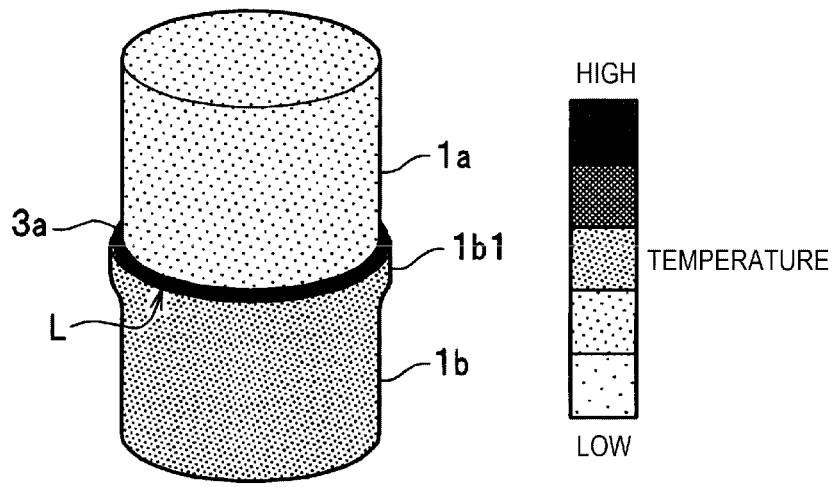
[FIG. 7(a)]
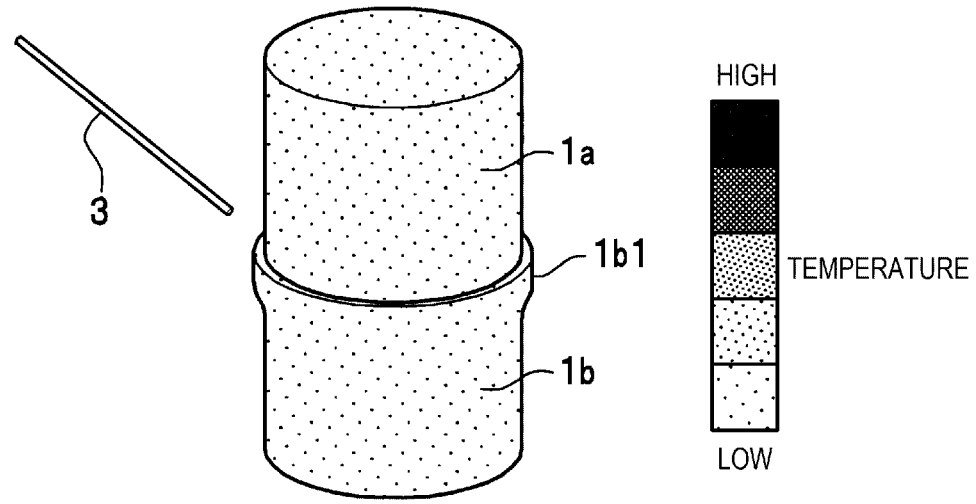
[FIG. 7(b)]
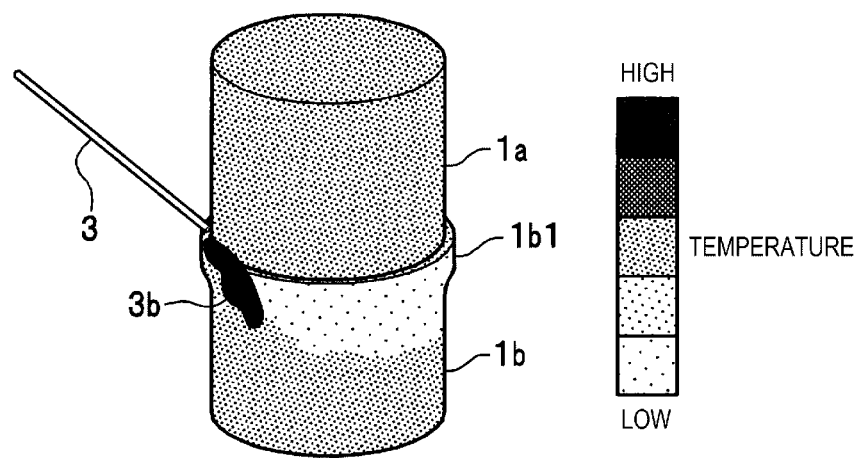

[FIG. 7(c)]
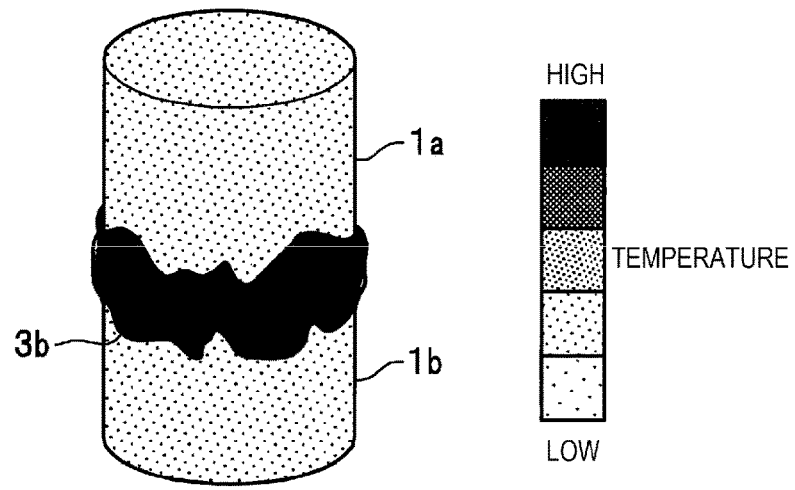
[FIG. 8(a)]
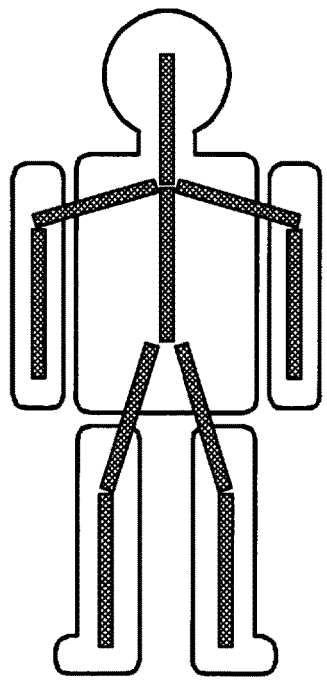
[FIG. 8(b)]
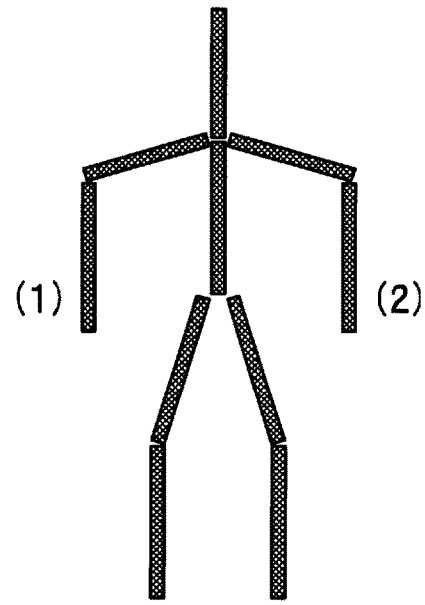

[FIG. 8(c)]
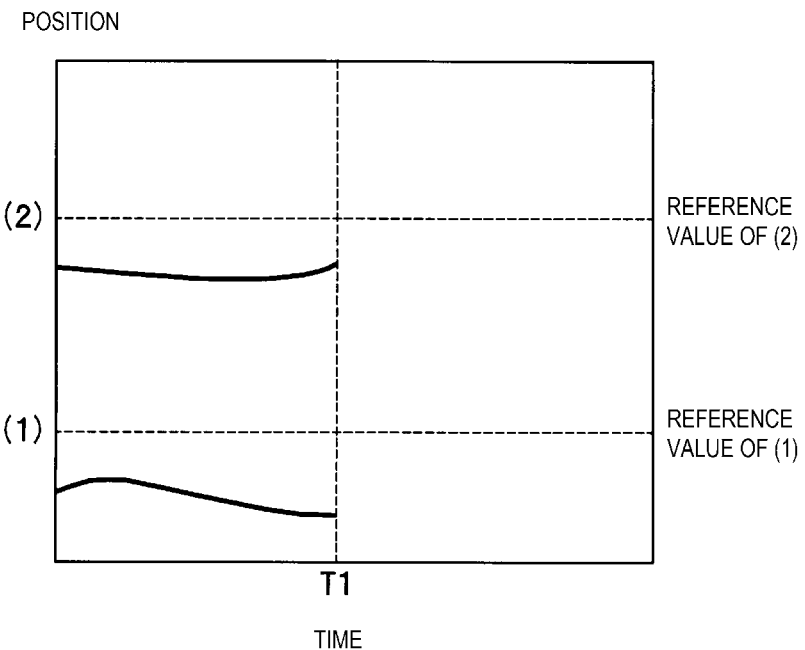
[FIG. 9(a)]
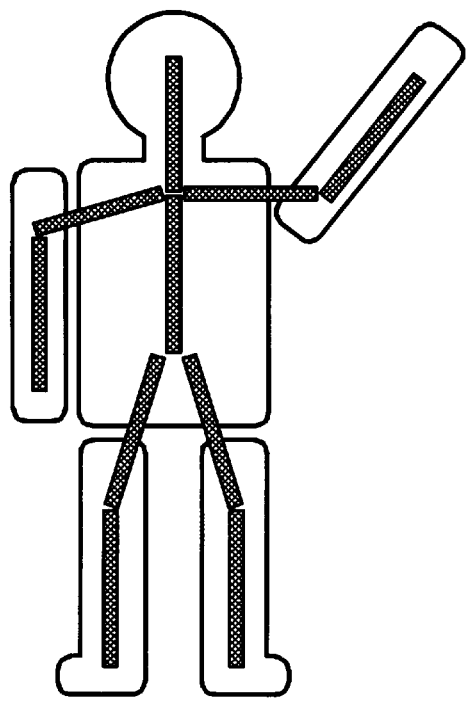
[FIG. 9(b)]
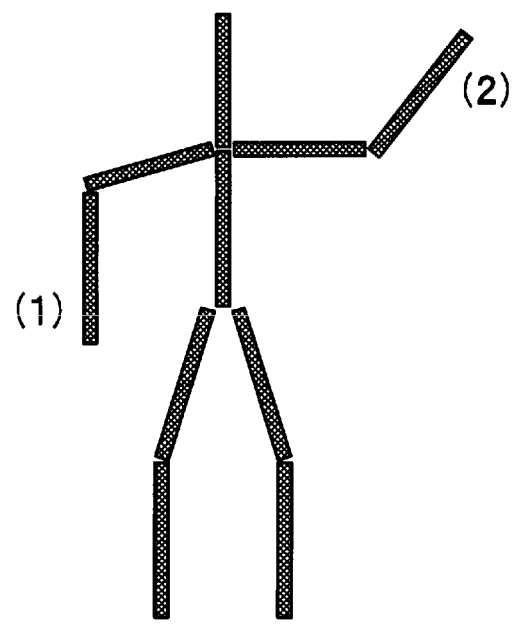

[FIG. 9(c)]
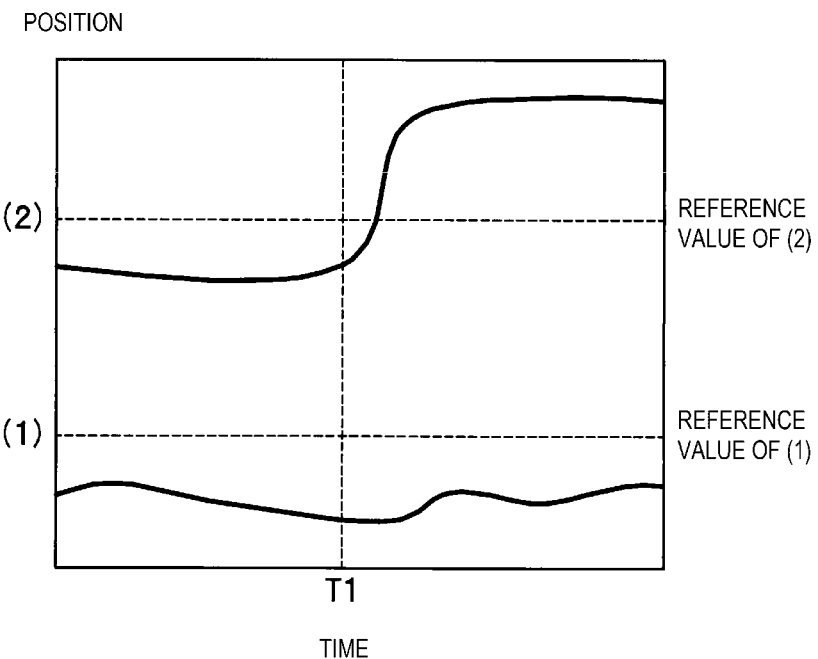
[FIG. 10(a)]
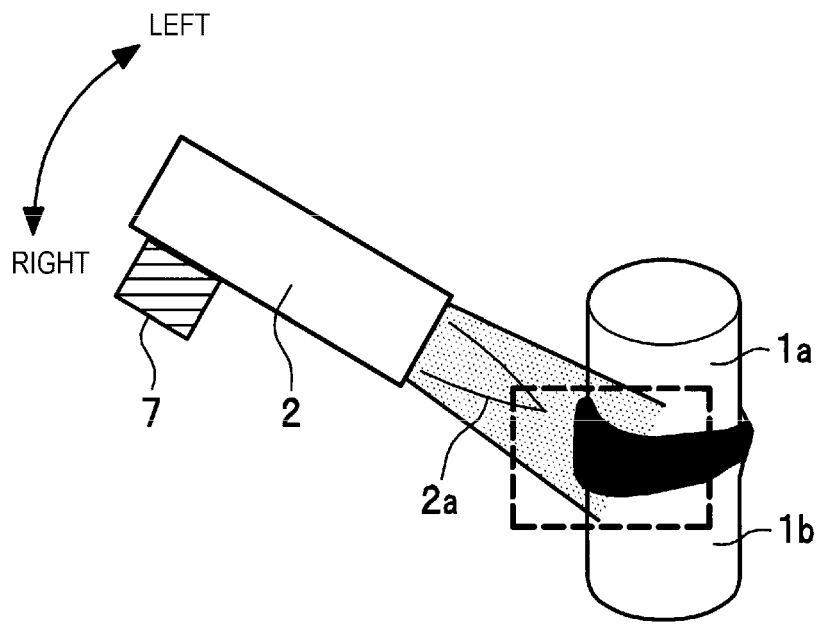

[FIG. 10(b)]
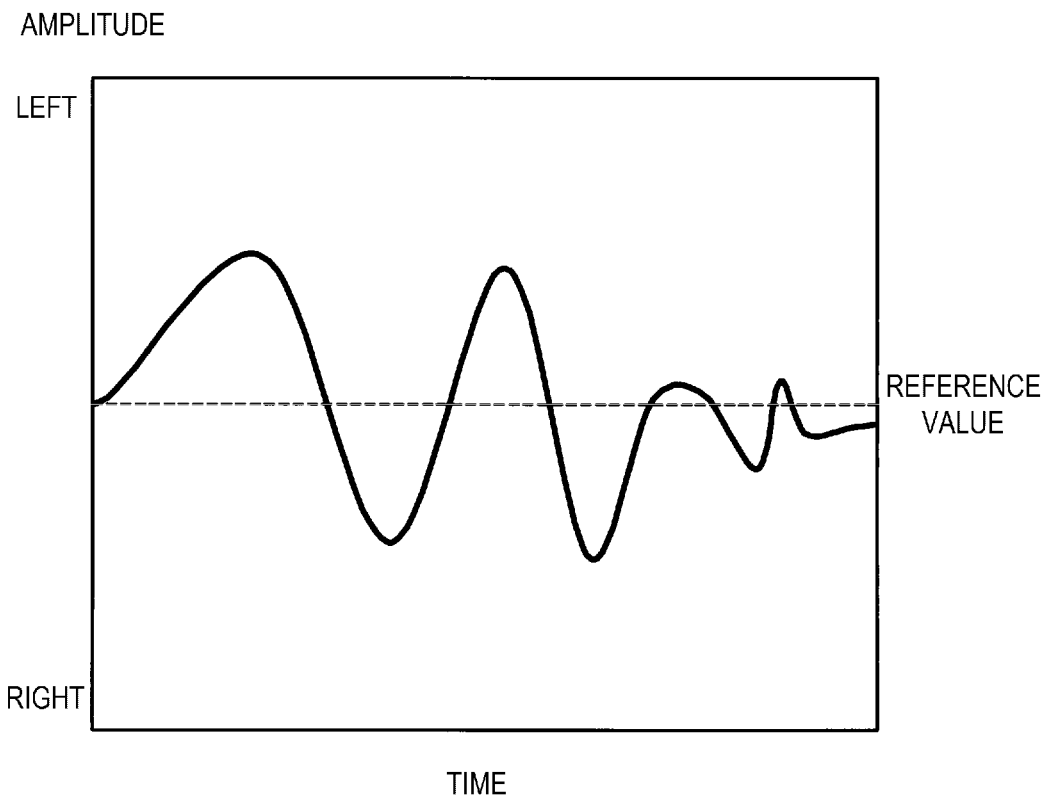
[FIG. 11(a)]
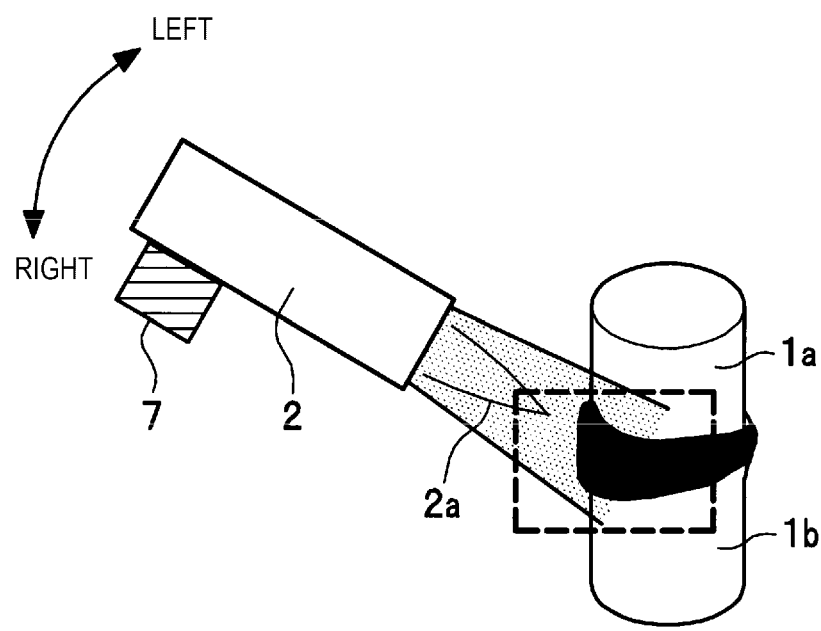

[FIG. 11(b)]
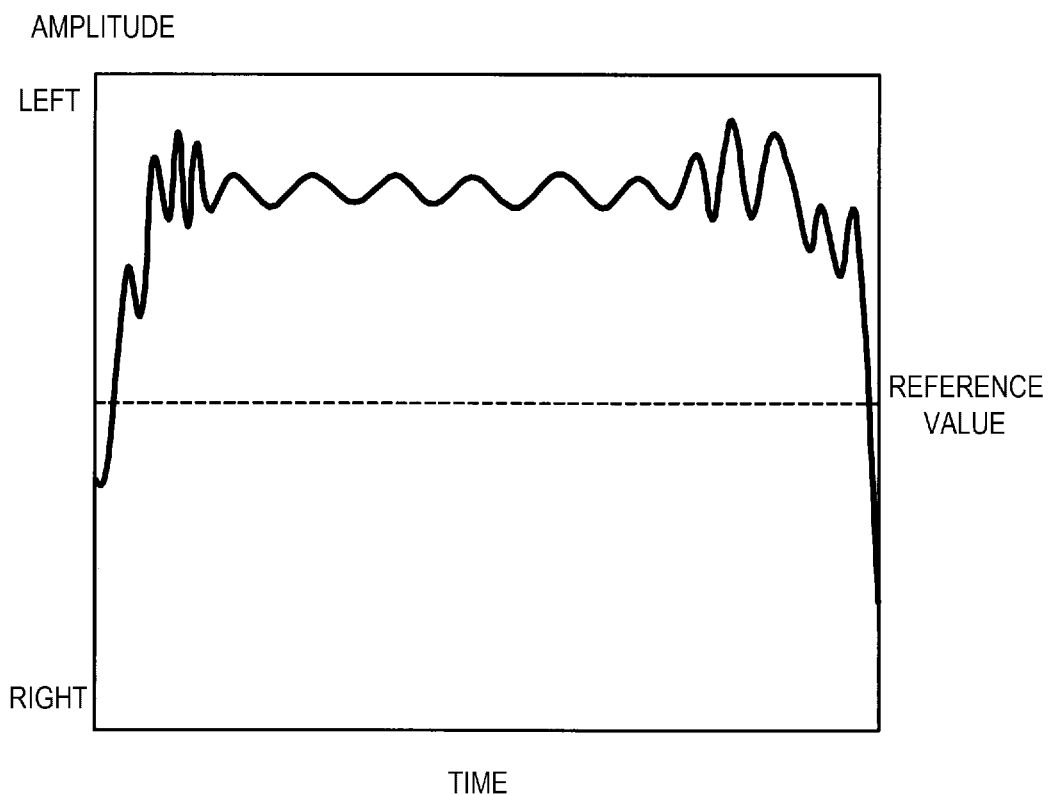
[FIG. 12(a)]
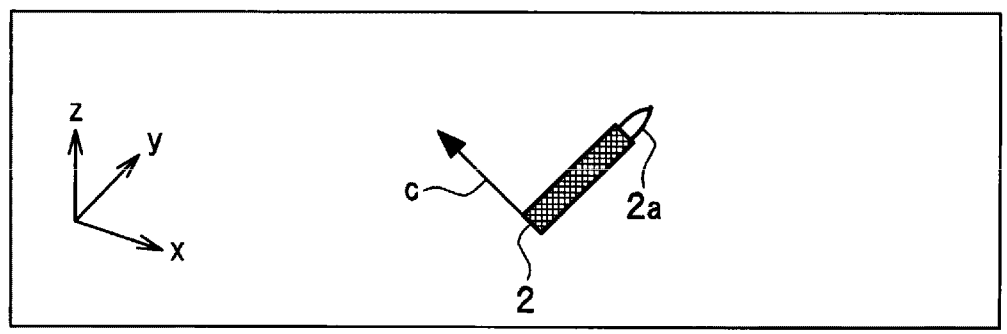

[FIG 12(b)]
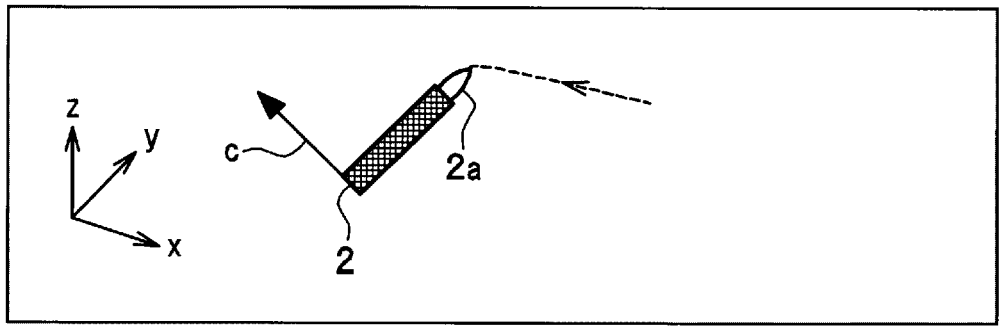
[FIG 12(c)]
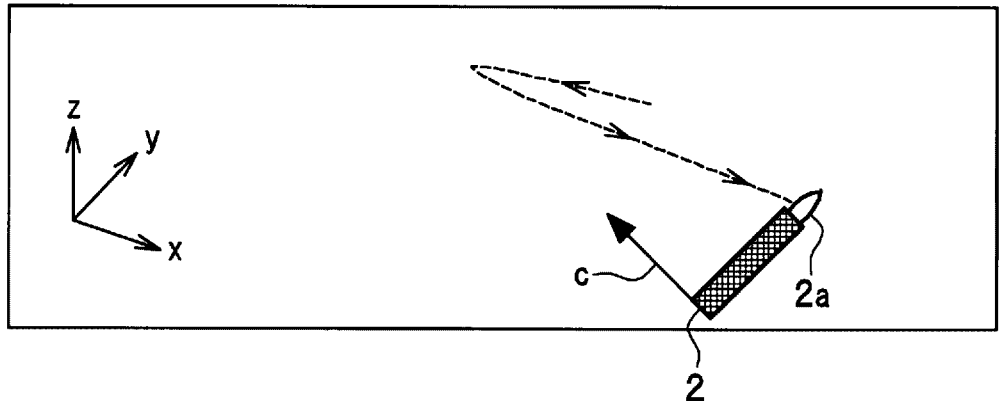
[FIG 12(d)]
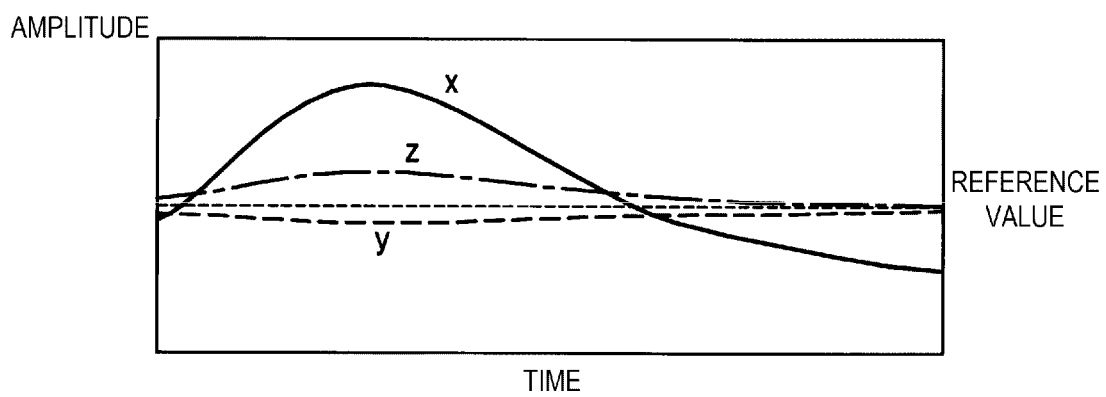

[FIG. 13(a)]
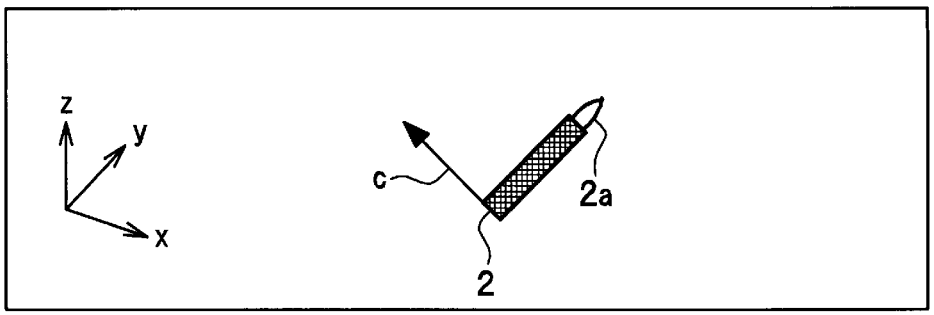
[FIG. 13(b)]
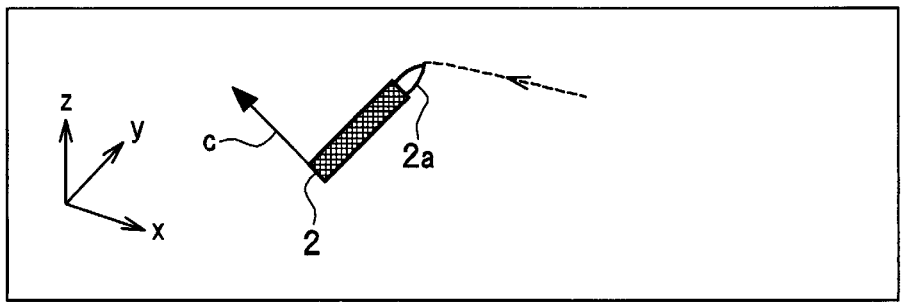
[FIG. 13(c)]
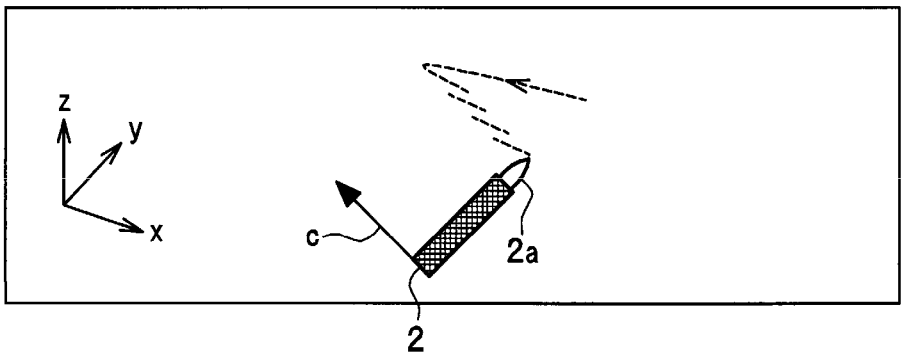
[FIG. 13(d)]
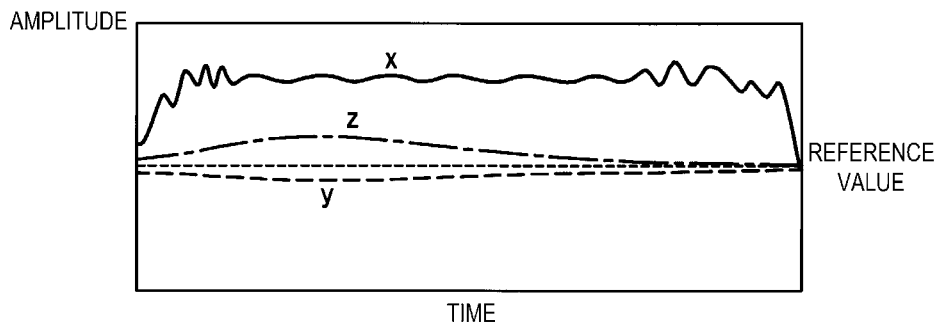

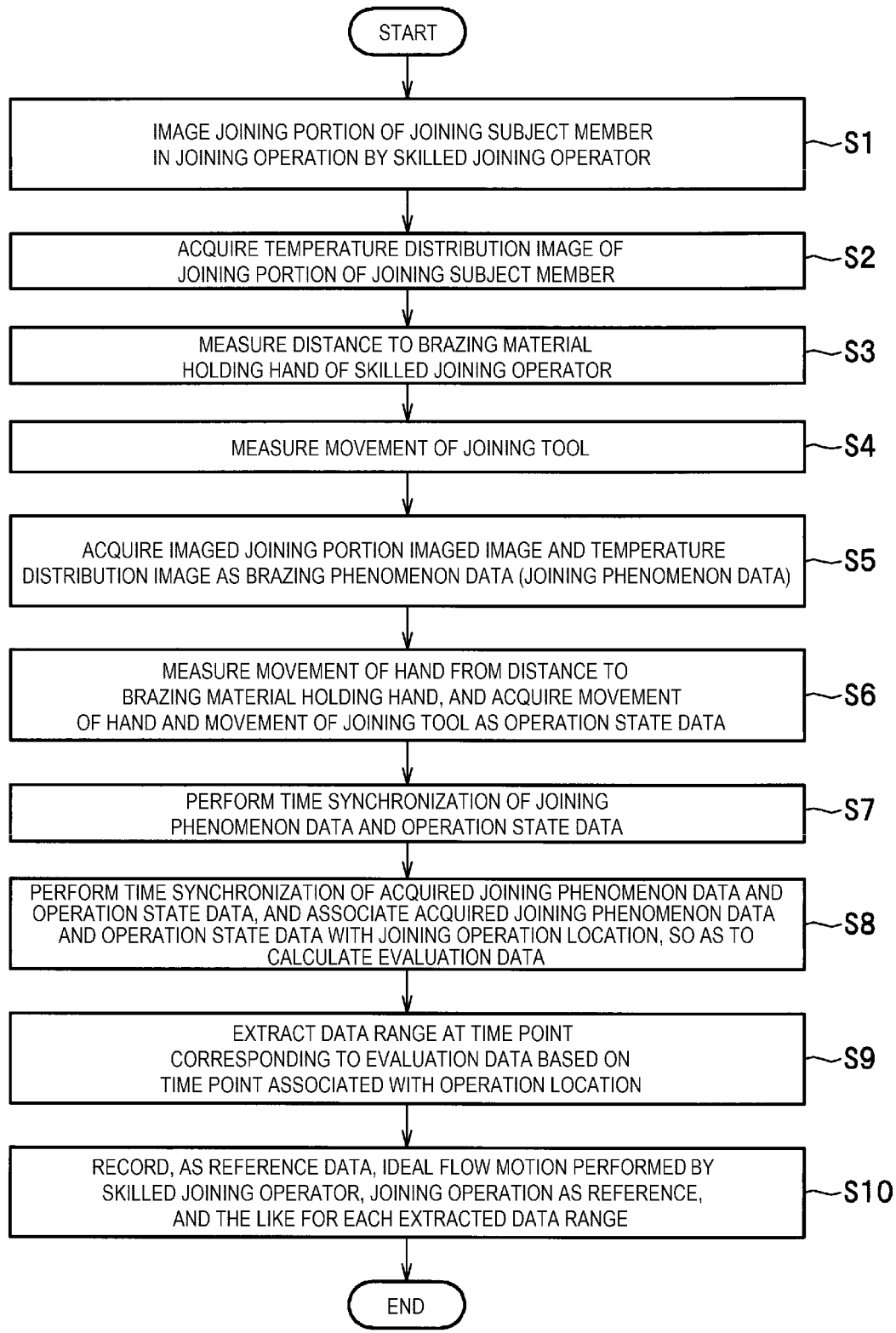
[FIG. 14]

[FIG. 15]
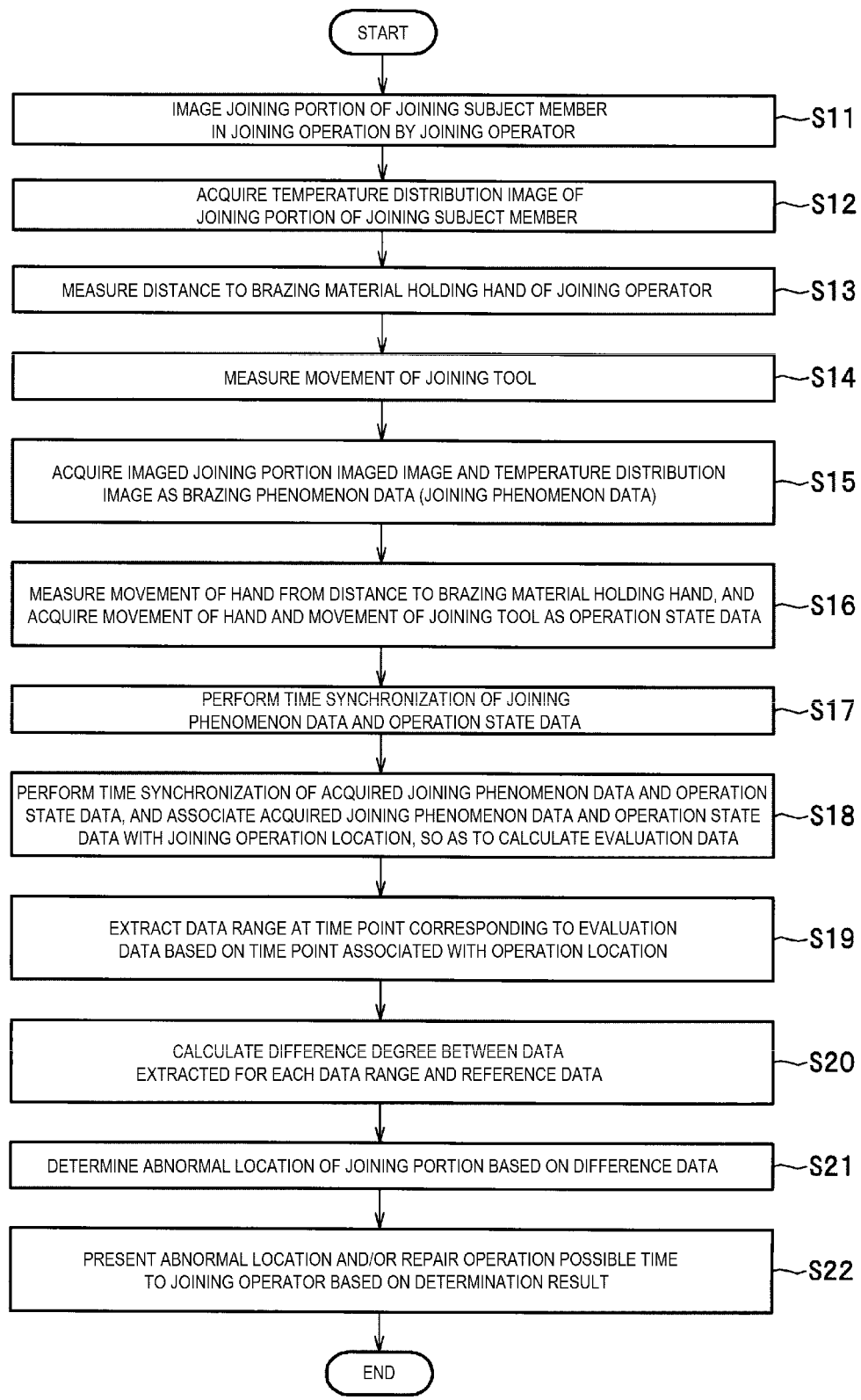

[FIG. 16]
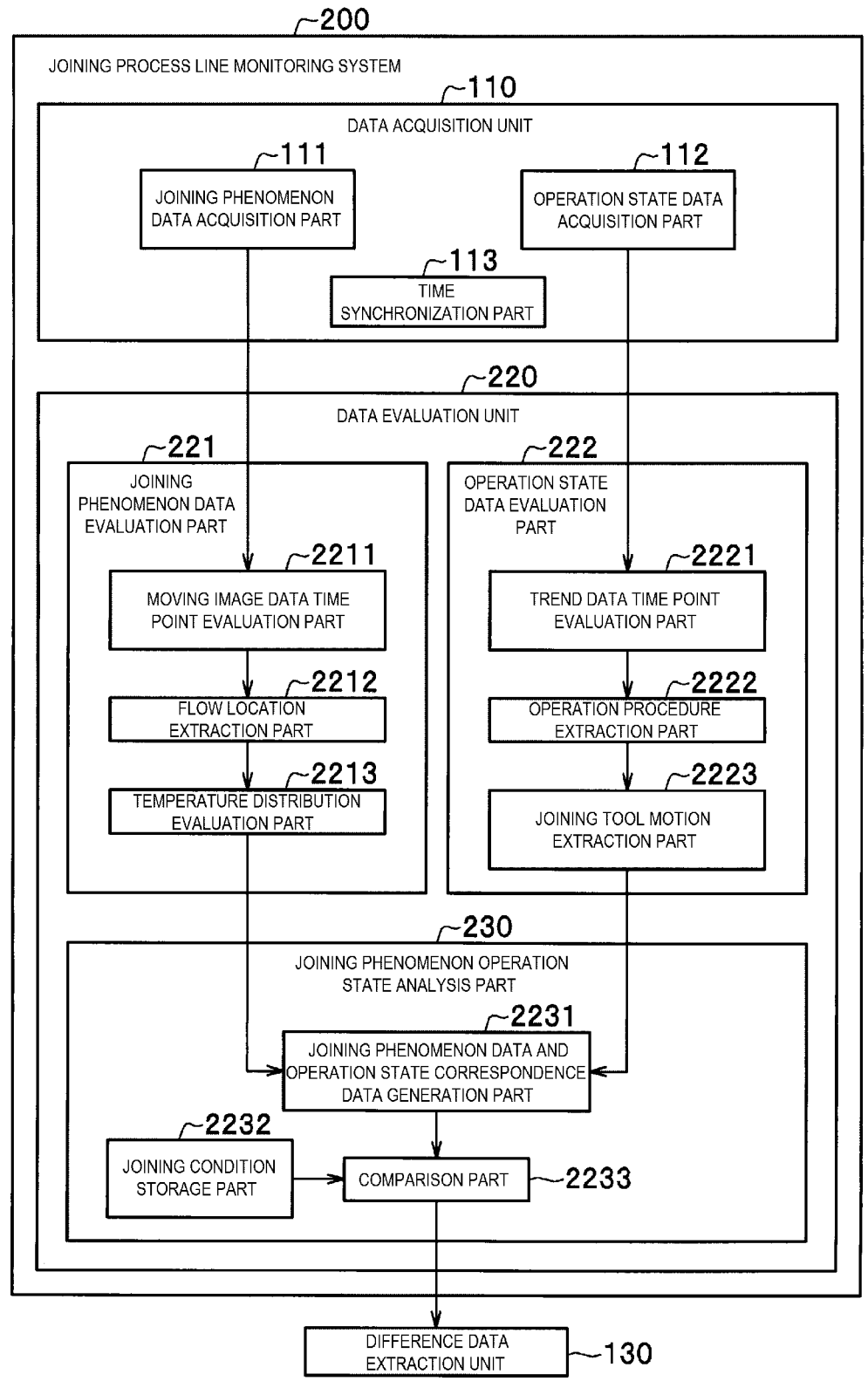

[FIG. 17(a)]
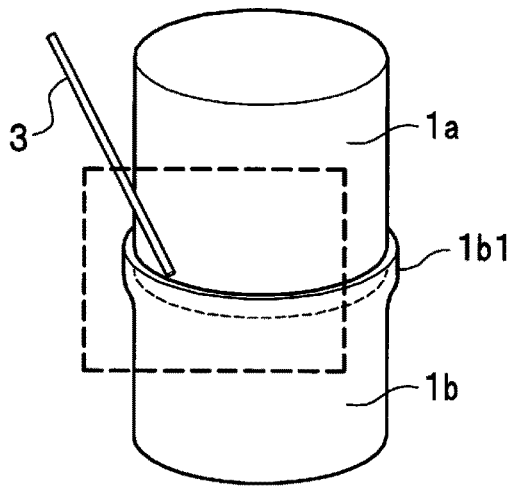
[FIG. 17(b)]     [FIG. 17(c)]     [FIG. 17(d)]
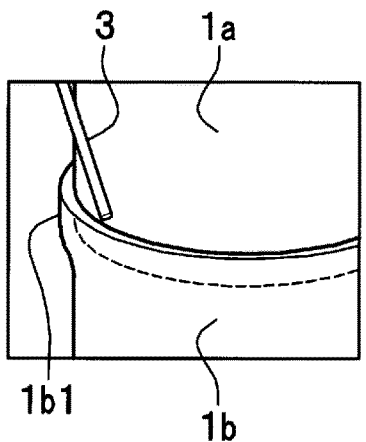 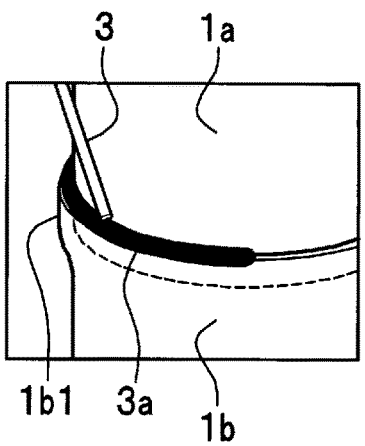 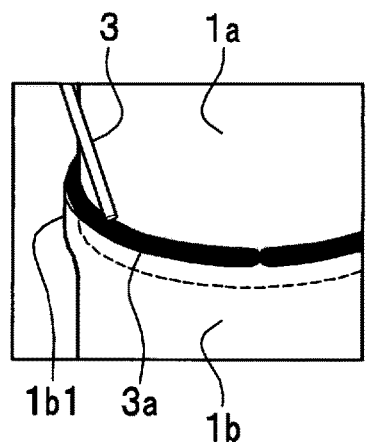
[FIG. 17(e)]     [FIG. 17(f)]     [FIG. 17(g)]
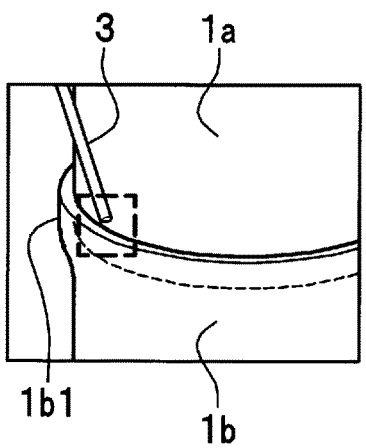 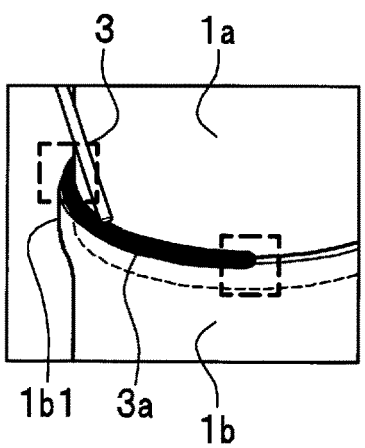 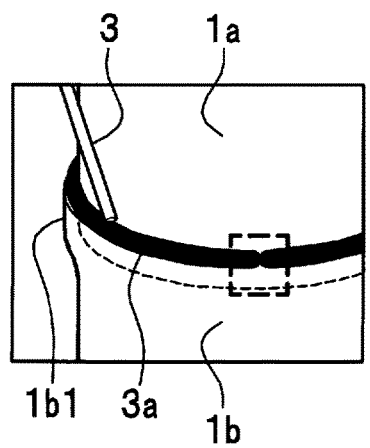

[FIG. 18(a)]
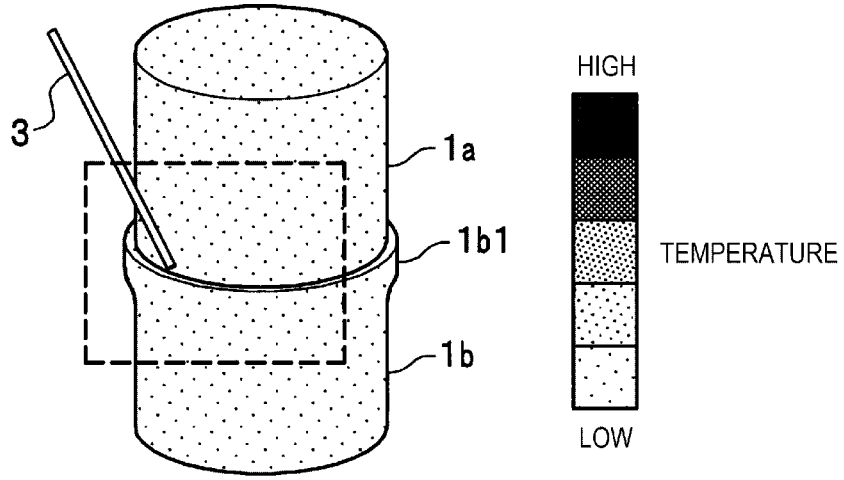
[FIG. 18(b)]
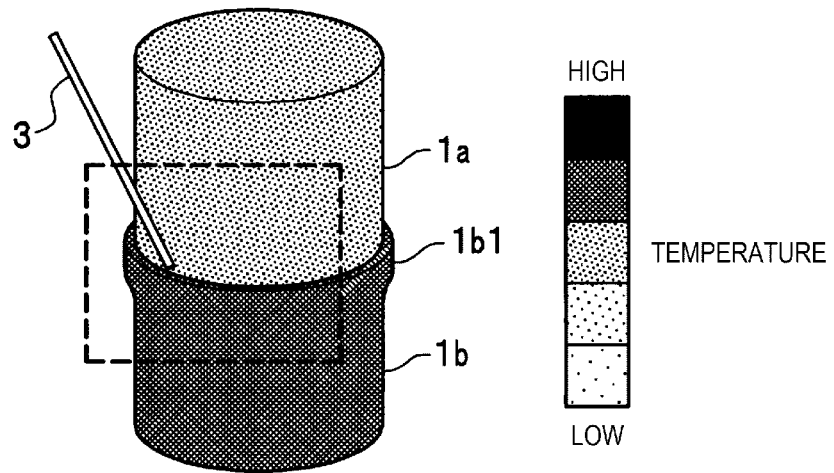
[FIG. 18(c)] [FIG. 18(d)] [FIG. 18(e)]
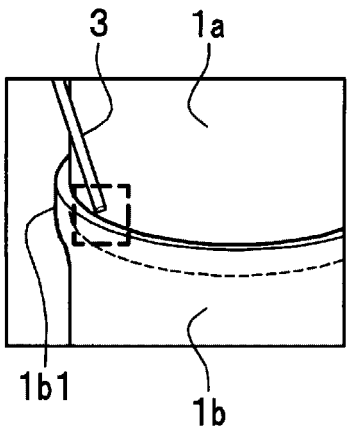 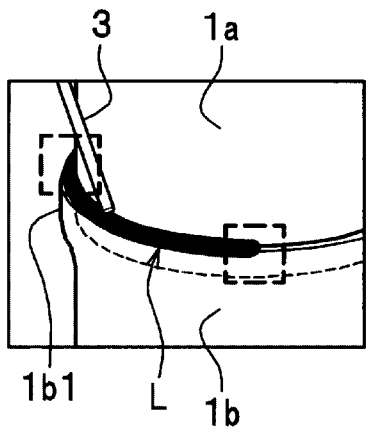 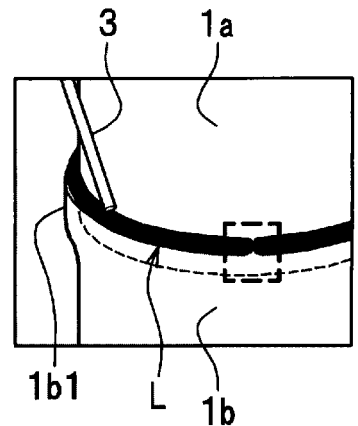

[FIG. 19(a)]
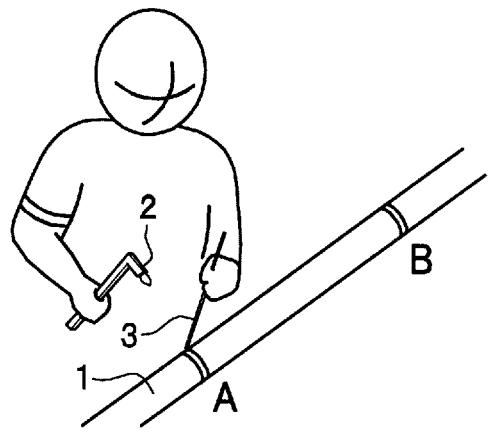
[FIG. 19(b)]
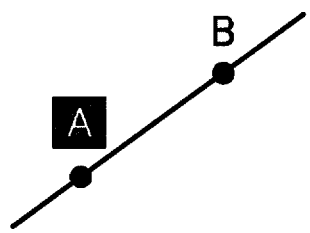
[FIG. 19(c)]
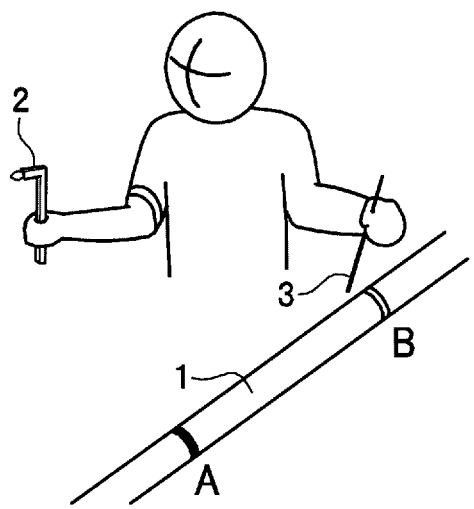
[FIG. 19(d)]
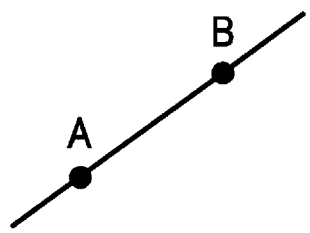
[FIG. 19(e)]
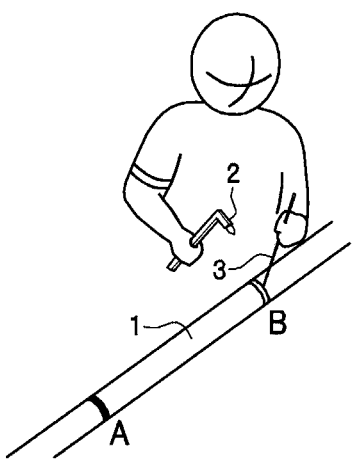
[FIG. 19(f)]
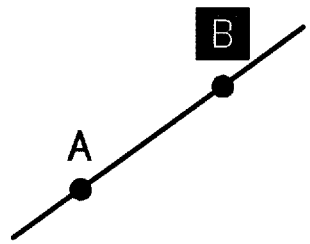

[FIG. 20(a)]
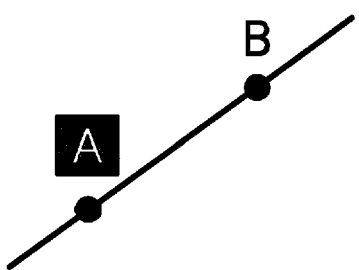
[FIG. 20(b)]
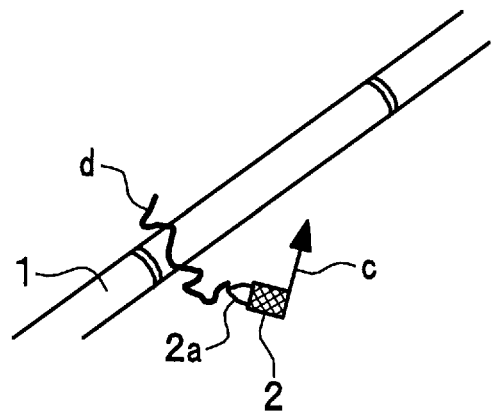
[FIG. 20(c)]
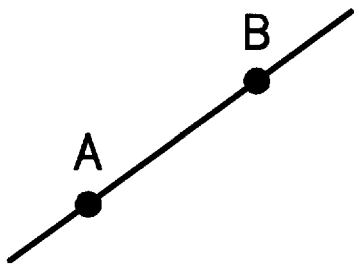
[FIG. 20(d)]
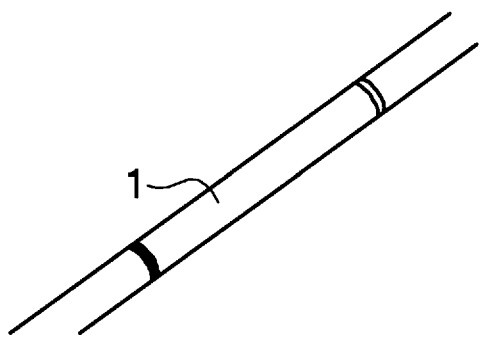
[FIG. 20(e)]
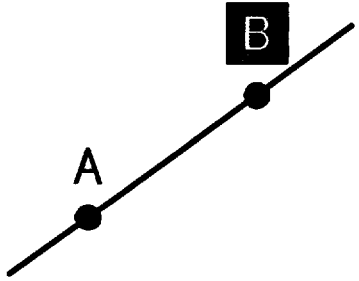
[FIG. 20(f)]
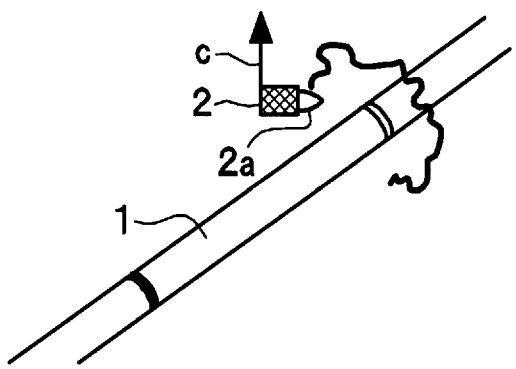

JOINING PROCESS LINE MONITORING SYSTEM

CROSS-REFERENCE TO RELATED APPLICATIONS

This application is a U.S. National Stage entry of PCT Application No: PCT/JP2018/032,072 filed Aug. 30, 2018, which claims priority to Japanese Patent Application No. 2017-181041, filed Sep. 21, 2017, the contents of which are incorporated herein by reference.

TECHNICAL FIELD

The present invention relates to a joining process line monitoring system.

BACKGROUND ART

A joining operation in brazing or welding is one of important processes in manufacturing a large structure body or a member having a complicated shape. In particular, in a structure in which stress is applied to a joining location or in a sealed container in which stress from internal pressure is applied, degree of completion of joining is related to safety, so that a process for checking a quality after the operation is provided. In general, a joining defect is detected by destructive inspection with extraction, or by non-destructive inspection with an X-ray image and ultrasonic flaw detection, so as to control the quality. In addition, when a defect or an incomplete portion is detected, a reworking process is added, and thus a process delay occurs.

Determination of whether a joining operation is acceptable is estimated based on the detected joining defect. Since joining involves flow of metal, it is extremely difficult to obtain the same workmanship even when performed with the same operation content. Therefore, the defect or the incomplete portion occurs.

In recent years, many cameras that can image phenomena accompanied by movement of a substance in a time direction in detail and sensors that can convert various phenomena into numerical data are developed. It is considered that such a state of a joining is imaged with the sensors to prevent occurrence of the defect and the incomplete portion, and to control the quality.

PTL 1 discloses a quality control method and a quality control device for a solder joining portion in which a temperature change of the joining portion is measured and suitability or unsuitability of the joining portion is determined and controlled based on a characteristic amount of measurement data.

PTL 2 discloses an automatic brazing method including performing temperature measurement with a vision sensor and feeding back the temperature measurement to a heating unit of an automatic device.

CITATION LIST

Patent Literature

PTL 1: JP-A-2015-155103
PTL 2: JP-A-6-262345

SUMMARY OF INVENTION

Technical Problem

However, since it is unclear whether the temperature change and a molten metal material (for example, brazing material, solder material, and welding material) are supplied to a joining location in the quality control method for the solder joining portion described in PTL 1, there is a problem that an incomplete portion is formed.

In addition, the automatic brazing method described in PTL 2 has a problem that automation cannot be performed in a joining operation for a large structure or a complicated shape that involves human operation.

The invention has been made in view of the above circumstances, and an object of the invention is to provide a joining process line monitoring system capable of preventing joining quality deterioration and operation delay.

Solution to Problem

In order to solve the above problems, a joining process line monitoring system includes: a joining phenomenon data acquisition unit configured to acquire a joining phenomenon of a joining subject member as phenomenon data; an operation state data acquisition unit configured to acquire a joining operation state of the joining subject member as operation state data; an evaluation data calculation unit configured to perform time synchronization of the acquired phenomenon data and the acquired operation state data, and associate the acquired phenomenon data and the acquired operation state data with each joining operation location, so as to calculate evaluation data; a difference data extraction unit configured to extract a difference between the evaluation data and reference data set in advance as difference data; and a presentation unit configured to present an abnormal location of a joining portion of the joining subject member based on the difference data.

Advantageous Effect

According to the invention, a joining process line monitoring system capable of preventing joining quality deterioration and operation delay is provided.

BRIEF DESCRIPTION OF DRAWINGS

FIGS. 1(a)-1(b) illustrate diagrams showing an example of a usage form of a joining process line monitoring system according to a first embodiment of the invention.

FIG. 2 illustrates a block diagram showing a configuration of the joining process line monitoring system according to the first embodiment.

FIGS. 3(a)-3(d) illustrate diagrams showing joining of two pipe members (joining subject member) using gas brazing in the joining process line monitoring system according to the first embodiment.

FIGS. 4(a)-4(d) illustrate diagrams showing an example in which a joining portion of pipe members (joining subject member) in a case of a normal product in the joining process line monitoring system according to the first embodiment is imaged with a high-speed camera, where (a) shows a state where a molten metal material is applied to the joining portion after the pipe members are sufficiently heated; (b) shows a state where the molten metal material melts and a melted molten metal material flows into a gap at the joining portion of the pipe members; (c) shows a shape of the molten metal material solidified in an entire gap at the joining portion of the pipe members as final workmanship; and (d) shows a sectional view of a main part of a portion surrounded by a broken line in (c).

FIGS. 5(a)-5(d) illustrate diagrams showing an example in which the joining portion of the pipe members (joining subject member) in a case of an abnormal product in the joining process line monitoring system according to the first embodiment is imaged with the high-speed camera, where (a) shows a state where the molten metal material is applied to the joining portion after the pipe members are sufficiently heated; (b) shows a state where a pointed location of the molten metal material is not suitable for the joining portion; (c) shows a shape of the molten metal material solidified in a gap at the joining portion of the pipe members as final workmanship; and (d) shows a sectional view of a main part of a portion surrounded by the broken line in (c).

FIGS. 6(a)-6(c) illustrate diagrams showing an example in which the joining portion of the pipe members (joining subject member) in the case of the normal product in the joining process line monitoring system according to the first embodiment is imaged with a thermo camera, where (a) shows an example of heating the pipe members with a gas burner or the like; (b) shows an example in which the thermo camera images a temperature rise and a temperature distribution of the pipe members (joining subject member) as an image; and (c) shows an example in which temperatures of the pipe members are both lowered after welding.

FIGS. 7(a)-7(c) illustrate diagrams showing an example in which the joining portion of the pipe members (joining subject member) in the case of the abnormal product in the joining process line monitoring system according to the first embodiment is imaged with the thermo camera, where (a) shows an example of heating the pipe members with the gas burner or the like; (b) shows an example in which the temperature distribution in which a heating location is biased is imaged as an image; (c) shows an example in which the molten metal material does not sufficiently enter the joining portion.

FIGS. 8(a)-8(c) illustrate diagrams showing an example of capturing a human motion using a distance sensor in the joining process line monitoring system according to the first embodiment, where (a) is an estimation example of a human skeleton; (b) is a numerical example of (a); and (c) is a determination example of (b).

FIGS. 9(a)-9(c) illustrate diagrams showing another example, different from FIG. 8, of capturing a human motion using the distance sensor in the joining process line monitoring system according to the first embodiment, where (a) is an estimation example of a human skeleton; (b) is a numerical example of (a); and (c) is a determination example of (b).

FIGS. 10(a)-10(b) illustrate diagrams showing an example of capturing a movement of the gas burner used by a skilled joining operator using an inertial sensor in the joining process line monitoring system according to the first embodiment, where (a) is a diagram showing a movement of a gas burner 2 which is used by the skilled joining operator; and (b) shows a diagram in which the movement of the gas burner is converted into data.

FIGS. 11(a)-11(b) illustrate diagrams showing an example of capturing a movement of the gas burner used by an unskilled joining operator, unlike FIG. 10, using the inertial sensor in the joining process line monitoring system according to the first embodiment, where FIG. 11(a) is a diagram showing the movement of the gas burner used by the unskilled joining operator; and FIG. 11(b) shows a diagram in which the movement of the gas burner is converted into data.

FIGS. 12(a)-12(d) illustrate diagrams showing an example of data of a movement of a tip end position of a joining tool using a triaxial inertial sensor in the joining process line monitoring system according to the first embodiment, where (a) to (c) are diagrams showing a movement of the tip end position of the joining tool used by the skilled joining operator; and (d) shows a diagram in which the movement of the tip end position of a torch of the gas burner is converted into data.

FIGS. 13(a)-13(d) illustrate diagrams showing an example of data of a movement of the tip end position of the joining tool, unlike FIG. 12, using the triaxial inertial sensor in the joining process line monitoring system according to the first embodiment, where (a) to (c) are diagrams showing a movement of the tip end position of the joining tool used by the unskilled joining operator; and (d) shows a diagram in which the movement of the tip end position of the torch of the gas burner is converted into data.

FIG. 14 illustrates a flowchart showing a reference data recording processing for recording data (reference data) serving as a reference for a joining operation in the joining process line monitoring system according to the first embodiment.

FIG. 15 illustrates a flowchart showing an abnormal location presentation processing for presenting an abnormal location of the joining portion of the joining subject member in the joining process line monitoring system according to the first embodiment.

FIG. 16 illustrates a block diagram showing a configuration of a joining process line monitoring system according to a second embodiment of the invention.

FIGS. 17(a)-17(g) illustrate diagrams showing an example of extraction of a flow location of a flow location extraction part of a joining phenomenon data evaluation part in the joining process line monitoring system according to the second embodiment, where (a) shows an example of joining the joining portion of the pipe members to be joined by applying brazing with the molten metal material; and (b) to (g) show enlarged views of a main part of a portion surrounded by the broken line in (a).

FIGS. 18(a)-18(e) illustrate diagrams showing an example of a temperature distribution of a temperature distribution evaluation part of the joining phenomenon data evaluation part in the joining process line monitoring system according to the second embodiment, where (a) shows a temperature distribution in which temperatures of the two pipe members are low and heating is insufficient; (b) shows a temperature distribution in which a temperature of one pipe member is higher than a temperature of the other pipe member and appropriate heating is performed; and (c) to (e) shows enlarged views of a main part of a portion surrounded by the broken line in (b).

FIGS. 19(a)-19(f) illustrate diagrams showing an example of an operation procedure extraction part of an operation state data evaluation part in the joining process line monitoring system according to the second embodiment, where (a) represents operation locations of the pipe members (joining subject member) of the joining operator; (b) schematically shows joining locations (operation locations) of (a); (c) represents the operation locations of the pipe members (joining subject member) when the joining operator moves; (d) schematically shows the joining locations of (c); (e) represents joining operations at the joining locations of the pipe members (joining subject member) after the joining operator has moved; and (f) schematically shows the joining locations of (e).

FIGS. 20(a)-20(f) illustrate diagrams showing an example of data of a movement of the tip end position of the joining tool using a triaxial inertial sensor in the joining process line monitoring system according to the second embodiment, where (a) corresponds to FIG. 19(b); (b) shows a case where a body of the joining operator is recognized as not belonging to any joining location; (c) corresponds to FIG. 19(d); (d) shows a case where the body of the joining operator is recognized as not belonging to any joining location; (e) corresponds to FIG. 19(f); and (f) shows a movement of the tip end position of the joining tool used by the joining operator when it is recognized that an operation is performed at the joining location shown in FIG. 19(f).

DESCRIPTION OF EMBODIMENTS

Hereinafter, modes for carrying out the invention (hereinafter referred to as "embodiments") will be described in detail with reference to the drawings. In the drawings, common portions are denoted by the same reference signs, and a repetitive description thereof is omitted.

First Embodiment

FIG. 1 illustrates diagrams showing an example of a usage form of a joining process line monitoring system according to a first embodiment of the invention. The present embodiment is an example applied to a manufacturing line monitoring system for a joining process such as brazing and welding.

In the present embodiment, gas brazing will be described as an example, but the invention is not limited to the gas brazing.

As shown in FIG. 1(a), a joining subject member 1 and a joining operator X holding a joining tool are present in a brazing operation area 10, and the joining operator X performs a joining operation. For example, in the case of the gas brazing, the joining tool is a torch (burner flame) 2a of a gas burner 2. The joining operator X heats the joining subject member 1 using the gas burner 2, and joins the member 1 by applying brazing with a molten metal material 3.

At this time, a joining process line monitoring system 100 images a brazing flow. For the imaging, for example, a digital camera or a high-speed camera 4 (joining phenomenon data acquisition unit) capable of recording a video can be used. A temperature of the joining subject member 1 is measured by a thermo camera 5 (joining phenomenon data acquisition unit). Other than the thermo camera 5, an infrared camera, an infrared sensor, and a thermocouple can be used to measure the temperature of the joining subject member 1. When the thermocouple is used to measure the temperatures, the temperature of the joining subject member 1 can be accurately measured. However, when the thermocouple is used, an installation location is limited. The present embodiment uses the thermo camera 5, which is non-contact and does not affect the joining.

Further, in a brazing operation, a distance sensor 6 (operation state data acquisition unit) that measures a distance to a brazing material holding hand of the joining operator X and an inertial sensor 7 (operation state data acquisition unit) that measures a movement of a torch holding hand of the joining operator X are provided, and measured values of the distance sensor 6 and the inertial sensor 7 are converted into data. The distance sensor 6 images body parts of the joining operator X, and measures a posture, a movement of a hand, and a position of a body. In addition, the inertial sensor 7 is installed on the joining tool (such as the torch 2a), and can image a fine movement of the joining tool.

As shown in FIG. 1(a), the joining process line monitoring system 100 can use, for example, a server 20 as a data processing device that executes a joining process line monitoring program.

The joining process line monitoring system 100 processes measurement data of the high-speed camera 4, the thermo camera 5, the distance sensor 6, and the inertial sensor 7, and notifies the joining operator X of an abnormality and an operation status. For example, as shown in FIG. 1(b), a display part 20a (presentation unit) of the server 20 displays a portion having a large difference from reference data (described later) of a joining phenomenon as an error. In addition, the server 20 calculates a time required for repair, and displays this repair operation possible time (10:00 seconds here) on the display part 20a. Reference signs a and b in FIG. 1(b) will be described later.

FIG. 2 is a block diagram showing a configuration of the joining process line monitoring system according to the first embodiment.

As shown in FIG. 2, the joining process line monitoring system 100 includes a data acquisition unit 110, a data evaluation unit 120 (evaluation data calculation unit), a difference data extraction unit 130, an abnormal location determination unit 140, and a presentation unit 150.

The joining process line monitoring system 100 includes the brazing operation area 10 for executing the joining operation in a manufacturing line for the joining process such as brazing and welding.

The joining subject member 1, the data acquisition unit 110 (joining phenomenon data acquisition unit, operation state data acquisition unit), and the presentation unit 150 are arranged in the brazing operation area 10. In addition, the joining operator performs operation in a vicinity of the joining subject member 1.

<Data Acquisition Unit 110>

The data acquisition unit 110 acquires joining phenomenon data (described later) and operation state data (described later).

The data acquisition unit 110 includes a joining phenomenon data acquisition part 111, an operation state data acquisition part 112, and a time synchronization part 113.

Although not shown in FIG. 2, the joining phenomenon data acquisition part 111 is connected to the high-speed camera 4 which images a brazing flow image, and the thermo camera 5 which acquires a temperature distribution image of a joining portion of the joining subject member 1. The joining phenomenon data acquisition part 111 acquires data imaged with the high-speed camera 4 and the thermo camera 5 as the joining phenomenon data. The joining phenomenon data is the brazing flow image and the temperature distribution image of the joining portion.

Although not shown in FIG. 2, the operation state data acquisition part 112 is connected to the distance sensor 6 which measures the distance to the brazing material holding hand, and the inertial sensor 7 which is installed on the joining tool (gas burner 2) and measures a movement of a tip end position of the torch 2a of the gas burner 2. The operation state data acquisition part 112 acquires data measured by the distance sensor 6 and the inertial sensor 7 as the operation state data of the joining operation (brazing operation).

The time synchronization part 113 performs time synchronization to temporally correspond acquisition timings of the joining phenomenon data of the joining phenomenon data acquisition part 111 and acquisition timings of the operation state data of the operation state data acquisition part 112 with one another. Accordingly, the movement of the human hand and the movement of the torch 2a of the gas burner 2 at measurement time points of the brazing operation (the brazing flow image and the temperature distribution image of the joining portion) are associated with each other.

<Data Evaluation Unit 120>

The data evaluation unit 120 performs time synchronization of the acquired joining phenomenon data and the acquired operation state data, and associates the acquired joining phenomenon data and the acquired operation state data with each joining operation location, so as to calculate evaluation data by.

The data evaluation unit 120 includes a joining phenomenon data evaluation part 121, an operation state data evaluation part 122, and a joining phenomenon operation state analysis part 123.

The joining phenomenon data evaluation part 121 evaluates a joining phenomenon of a joining subject member based on the joining phenomenon data acquired by the joining phenomenon data acquisition part 111. When the joining phenomenon data evaluation part 121 can evaluate the joining phenomenon of the joining subject member (evaluation target as significant joining phenomenon data), the joining phenomenon data evaluation part 121 outputs a joining phenomenon evaluation result to the joining phenomenon operation state analysis part 123.

The operation state data evaluation part 122 evaluates a joining operation state of the joining subject member based on the operation state data acquired by the operation state data acquisition part 112. When the operation state data evaluation part 122 can evaluate the joining operation state of the joining subject member (evaluation target as significant joining operation state data), the operation state data evaluation part 122 outputs a joining operation state evaluation result to the joining phenomenon operation state analysis part 123.

The joining phenomenon operation state analysis part 123 performs time synchronization of the joining phenomenon evaluation result and the joining operation state evaluation result, and associates the results with each joining operation location, so as to analyze a joining phenomenon operation state and calculate evaluation data.

<Difference Data Extraction Unit 130>

The difference data extraction unit 130 extracts difference data between the evaluation data and the reference data recorded in advance.

The difference data extraction unit 130 includes an operation location determination part 131, a data range extraction part 132, a reference data storage part 133 (reference data storage unit), and a difference degree calculation part 134.

The operation location determination part 131 determines an operation location based on operation procedure extraction data set in advance.

The data range extraction part 132 extracts a data range at a time point corresponding to the evaluation data based on a time point associated with the determined operation location.

The reference data storage part 133 records in advance, as the reference data, an ideal flow motion performed by a skilled joining operator, a reference joining operation, and the like for a reference joining operation prepared in advance. The reference data storage part 133 stores a threshold value when determining an abnormal location. It is preferable that the reference data to be stored by the reference data storage part 133 corresponds to a skill level of the operator.

The difference degree calculation part 134 extracts a difference between the evaluation data and the reference data recorded in advance in the reference data storage part 133. Specifically, the difference degree calculation part 134 extracts a time point corresponding to the determined operation location for the reference joining operation prepared in advance when the reference data is recorded, so as to generate reference data associated with each operation location.

On the other hand, the difference degree calculation part 134 calculates a difference degree between the data extracted by the data range extraction part 132 and the reference data when an abnormal location is to be presented, and outputs the difference degree to the abnormal location determination unit 140 as difference data.

<Abnormal Location Determination Unit 140>

The abnormal location determination unit 140 determines an abnormal location of the joining portion based on the difference data. Specifically, the abnormal location determination unit 140 determines an abnormal location based on the threshold value set in advance for the difference degree obtained by the difference data extraction unit 130. The abnormal location determination unit 140 determines a portion having a large difference from the reference data of the joining phenomenon as an abnormal location. The abnormal location determination unit 140 performs abnormality determination for each operation location, and determines an abnormal location of each operation location. The abnormal location corresponds to a review location of a joining location.

In addition, the abnormal location determination unit 140 calculates the repair operation possible time (operation allocation time) which is an allowed time given for repairing an abnormal location (the review location of the joining location). That is, in the joining process line monitoring system 100, the joining subject member 1 flows in a line during manufacture. When the repair operation possible time (operation allocation time) is presented to the joining operator, the joining operator understands that repair needs to be performed within that time.

<Presentation Unit 150>

The presentation unit 150 presents (notifies) the abnormal location to the joining operator X based on a determination result of the abnormal location determination unit 140. Although a presentation method is not limited, for example, the presentation unit 150 displays the abnormal location as an error (see the reference sign a in FIG. 1(b)) on a display part 150a (corresponding to the display part 20a of the server 20 in FIG. 1(b)). In addition, the presentation unit 150 projects light such as laser light on the abnormal location of the actual joining subject member 1 using a light projecting part 150b (see FIG. 2), and notifies the joining operator X of the abnormal location with the projected light. Accordingly, the joining operator X can quickly know a repair location.

The presentation unit 150 presents (displays) the repair operation possible time (operation allocation time) (see the reference sign b in FIG. 1(b)) for repairing the abnormal location based on the determination result of the abnormal location determination unit 140. Accordingly, since the joining operator understands that the repair needs to be performed within the displayed (notified) repair operation possible time, the repair can be performed in accordance with that time. Conversely, an estimation can be made that the repair cannot be completed within the repair operation possible time. If a skill level of the joining operator is registered in advance in the joining process line monitoring system 100, whether the repair cannot be completed within the repair operation possible time can be determined according to the skill level. When it is determined that the repair cannot be completed within the repair operation possible time, an alarm is raised to notify another operator, a manager, or the like that the repair is not completed. It is possible to avoid a situation in which the repair operation that greatly exceeds the repair operation possible time is performed and the entire line is affected. As a result, a process continuation time can be adjusted and a production delay can be reduced.

The data evaluation unit 120, the difference data extraction unit 130, and the abnormal location determination unit 140 are configured with a general-purpose or dedicated processing server such as a PC 20 shown in FIG. 1(*a*). The data evaluation unit 120, the difference data extraction unit 130, and the abnormal location determination unit 140 are implemented by a central processing unit (CPU) fetching and executing, in a RAM, a program stored in a storage part (not shown) of the server. The presentation unit 150 is a display part of the server or the like described above.

Hereinafter, a joining process line monitoring method of the joining process line monitoring system 100 configured as described above will be described.

FIG. 3 illustrates diagrams showing an example of joining of two pipe members (joining subject member 1) using the gas brazing.

As shown in FIG. 3(*a*), the joining subject member 1 using the gas brazing is two cylindrical pipe members 1*a* and 1*b*. The pipe member 1*a* and the pipe member 1*b* have different pipe inner diameters at the joining portion so that the pipe members can be assembled. The pipe member 1*b* has a larger diameter than that of the pipe member 1*a*, and an outer edge portion 1*b*1 is formed at an upper end of the pipe member 1*b*. As shown by an arrow in FIG. 3(*a*), a bottom portion of the pipe member 1*a* is inserted inside the outer edge portion 1*b*1 of the pipe member 1*b*.

As shown in FIG. 3(*b*), the bottom portion of the pipe member 1*a* is combined with the outer edge portion 1*b*1 at the upper end of the pipe member 1*b*.

As shown in FIG. 3(*c*), the joining portion of the pipe member 1*a* and the pipe member 1*b* is heated with the torch 2*a* of the gas burner 2 from a diagonally upper side. At this time, the gas burner 2 uniformly heats the entire joining portion between the pipe member 1*a* and the pipe member 1*b*. Therefore, the joining portion is heated in an outer circumferential direction by rotating while shifting a direction of the torch 2*a* of the gas burner 2 up and down little by little.

As shown in FIG. 3(*d*), when the pipe member 1*a* and the pipe member 1*b* to be joined are sufficiently warmed, the brazing is applied with the molten metal material 3. The molten metal material 3 melts and enters a gap between the pipe member 1*a* and the pipe member 1*b* due to a capillary phenomenon, and joins the pipe member 1*a* and the pipe member 1*b*. When it is important to ensure a sealing property, such as when the joining subject is a pressure vessel or the like, whether a molten metal material closes an entirety is related to a degree of quality.

Next, the data acquisition unit 110 which converts the joining operation into data will be described with reference to FIGS. 4 to 13.

Imaging Example of High-Speed Camera

First, an imaging example of the high-speed camera 4 (see FIG. 1) will be described.
<Normal Product>
FIG. 4 illustrates diagrams showing an example in which the joining portion of pipe members (joining subject member) in a case of a normal product is imaged with the high-speed camera 4.

FIG. 4(*a*) images a state where the molten metal material 3 is applied to the joining portion after the pipe member 1*a* and the pipe member 1*b* are sufficiently heated.

FIG. 4(*b*) shows that a state is imaged where the molten metal material 3 melts and a melted molten metal material 3*a* flows into the gap at the joining portion of the pipe member 1*a* and the pipe member 1*b*.

FIG. 4(*c*) shows that a shape of the molten metal material 3*a* solidified in the entire gap at the joining portion of the pipe member 1*a* and the pipe member 1*b* is imaged as final workmanship.

FIG. 4(*d*) shows a sectional view of a main part of a portion surrounded by a broken line in FIG. 4(*c*). As shown in FIG. 4(*d*), the molten metal material 3*a* sufficiently closes the joining portion.

Such a curved surface shape is referred to as a fillet, and the fillet-shaped molten metal material 3*a* is obtained over an entire joining line L (entire circumference) of the joining portion.
<Abnormal Product>
FIG. 5 illustrates diagrams showing an example in which the joining portion of the pipe members (joining subject member) in a case of an abnormal product is imaged with the high-speed camera 4.

FIG. 5(*a*) shows a state where the molten metal material 3*a* is applied to the joining portion after the pipe member 1*a* and the pipe member 1*b* are sufficiently heated.

FIG. 5(*b*) shows that a deposition location of the molten metal material 3 is not suitable for the joining portion. Therefore, a state where a brazing material (a molten metal material 3*b*) does not enter the gap between the pipe member 1*a* and the pipe member 1*b* is imaged.

FIG. 5(*c*) shows that a shape of the molten metal material 3*b* solidified in a gap at the joining portion of the pipe member 1*a* and the pipe member 1*b* is imaged as final workmanship.

FIG. 5(*d*) shows a sectional view of a main part of a portion surrounded by the broken line in FIG. 5(*c*). As shown in FIG. 5(*d*), since the molten metal material 3*b* does not sufficiently enter the joining portion, the fillet shape cannot be obtained over the entire joining line (entire circumference). As shown in FIG. 5(*d*), since the molten metal material 3*b* is insufficient, a concave shape is formed at an entrance where the pipe member 1*a* and the pipe member 1*b* overlap.

Thus, the following measurement data can be obtained by imaging the joining portion of the pipe members (the joining subject member 1) with the high-speed camera 4 (see FIG. 1). That is, by imaging with the high-speed camera 4 (see FIG. 1), a contact position where the molten metal material 3 is in contact with the pipe members (the joining subject member 1) and a position where the brazing material flows can be imaged, and a finished fillet shape of the molten metal material 3 can be converted into data. By converting the brazing flow into data, it is possible to know a phenomenon that leads to a defect or an incomplete portion.

Imaging Example of Thermo Camera

Next, an imaging example of the thermo camera 5 (see FIG. 1) will be described.
<Normal Product>
FIG. 6 illustrates diagrams showing an example in which the joining portion of the pipe members (the joining subject member 1) in the case of the normal product is imaged with the thermo camera 5. In FIG. 6, the temperatures of the joining subject member are shown with a density of shading in FIG. 6. Dense shading represents a high temperature, and coarse shading represents a low temperature (hereinafter, the same notation method is used).

In FIG. 6(a), the pipe member 1a and the pipe member 1b are heated with the gas burner 2 (not shown). After the heating is sufficiently performed, the molten metal material 3 is applied to the joining portion. The thermo camera 5 images a temperature rise and a temperature distribution of the pipe members (the joining subject member 1) as an image.

FIG. 6(b) shows that the thermo camera 5 images the temperature rise and the temperature distribution of the pipe members (the joining subject member 1) as an image. In the case of FIG. 6(b), the temperature distribution is imaged as an image in which a temperature of the pipe member 1b is higher than a temperature of the pipe member 1a, the outer edge portion 1b1 of the pipe member 1b is sufficiently heated over an entire circumference, and appropriate heating is performed also to the pipe member 1a.

FIG. 6(c) shows that the temperatures of the pipe member 1a and the pipe member 1b are both lowered after welding. The temperature variation and the temperature distribution when the molten metal material 3 is brazed are imaged as an image. In the case of FIG. 6(c), the molten metal material 3a sufficiently closes the joining portion.

Since the temperature variation and the temperature distribution when the molten metal material 3 is brazed can be imaged as an image, brazing flow and temperature data can be recorded.

Here, in order for the molten metal material 3 to sufficiently close the joining portion, the temperatures of the pipe members (the joining subject member 1) are held while satisfying a condition lower than a melting point of the members themselves and higher than a melting point of the molten metal material 3 for a time period during which the molten metal material 3 flows in.

<Abnormal Product>

FIG. 7 illustrates diagrams showing an example in which the joining portion of the pipe members (the joining subject member 1) in the case of the abnormal product is imaged with the thermo camera 5.

In FIG. 7(a), the pipe member 1a and the pipe member 1b are heated with the gas burner 2 (not shown) or the like. After the heating is sufficiently performed, the molten metal material 3 is applied to the joining portion. The thermo camera 5 images a temperature rise and a temperature distribution of the pipe members (the joining subject member 1) as an image.

FIG. 7(b) shows that the temperature distribution in which a heating location is biased is imaged as an image. In the case of FIG. 7(b), a part of the pipe member 1b is not sufficiently heated, that is, a portion having a low temperature is formed. Thus, when the portion having the low temperature is formed, since the molten metal material 3b is less likely to flow to the portion having the low temperature, the brazing material does not appropriately enter the joining portion.

As shown in FIG. 7(c), since the molten metal material 3b does not sufficiently enter the joining portion, the fillet shape cannot be obtained over the entire joining line (entire circumference). Since the temperature variation and the temperature distribution when the molten metal material 3 is brazed can be imaged as an image, data of the brazing flow and the temperature can be recorded.

Thus, the following measurement data can be obtained by imaging the joining portion of the pipe members (the joining subject member 1) with the thermo camera 5 (see FIG. 1). That is, with the thermo camera 5, the temperatures of the pipe members (the joining subject member 1) and the molten metal material 3, the temperature distribution of the pipe members (the joining subject member 1), and the temperature holding time can be converted into data. By converting the temperature with respect to the brazing flow into data, it is possible to know a phenomenon that leads to the defect or the incomplete portion.

Measurement Example of Distance Sensor

Next, a measurement example of the distance sensor 6 (see FIG. 1) will be described.

Example 1

FIG. 8 illustrates diagrams showing an example of capturing a human motion using the distance sensor 6, where FIG. 8(a) is an estimation example of a human skeleton; FIG. 8(b) is a numerical example of FIG. 8(a); and FIG. 8(c) is a determination example of FIG. 8(b).

The distance sensor 6 (see FIG. 1) is used to measure distances of human hands, feet, body, and the like for display on an image. Based on the measured distance data, the hands, the feet, the body, and the like are recognized, and these points are connected to convert motion into data.

As shown in FIG. 8(a), based on data of the distance sensor 6, the human skeleton (see a hatched portion) is estimated and converted into data. Each bone can be quantified by a relative distance.

As shown in FIG. 8(b), an example in which a relative distance between a right arm (1) and a left arm (2) is quantified will be described.

FIG. 8(c) is a graph showing positions of the right arm (1) and the left arm (2) shown in FIG. 8(b) with respect to a time axis (horizontal axis). FIG. 8(c) shows an example in which both arms are directed downward, and a status in which a value of the right arm (1) is below a right arm (1) reference value and a value of the left arm (2) is below a left arm (2) reference value continues until a time point T1.

Example 2

FIG. 9 illustrates diagrams showing another example, different from FIG. 8, of capturing a human motion using the distance sensor 6, where FIG. 9(a) is an estimation example of a human skeleton, FIG. 9(b) is a numerical example of FIG. 9(a), and FIG. 9(c) is a determination example of FIG. 9(b). FIG. 9 correspond to notations of FIG. 8.

As shown in FIG. 9(a), based on data of the distance sensor (see FIG. 1), the human skeleton (see a hatched portion) is estimated and converted into data. In FIG. 9(a), the left arm (2) is raised.

FIG. 9(b) is an example in which a relative distance between the right arm (1) and the left arm (2) is quantified. The left arm (2) is raised at a certain time.

FIG. 9(c) is a graph showing positions of the right arm (1) and the left arm (2) shown in FIG. 9(b) with respect to the time axis (horizontal axis). FIG. 9(c) shows an example of data in which both arms are directed downward until the time point T1 whereas the left arm (2) is raised after the time point T1. The right arm (1) remains below the right arm (1) reference value. On the other hand, the left arm (2) obtains a transition in which a value thereof exceeds the left arm (2) reference value.

Thus, it is possible to estimate human skeleton information by imaging the distances of the human hands, feet, body, and the like with the distance sensor 6 (see FIG. 1), and to convert the human motion and position into data in time series. Accordingly, a positional relationship with the joining subject member and an operation procedure can be quantified and known.

Measurement Example of Inertial Sensor

Next, a measurement example of the inertial sensor 7 (see FIG. 1) will be described with reference to FIGS. 10 to 13.
<Skilled Joining Operator>

FIG. 10 illustrates diagrams showing an example of capturing a movement of the gas burner 2 used by the skilled joining operator using the inertial sensor 7, where FIG. 10(a) is a diagram showing a movement of the gas burner 2 which is used by the skilled joining operator; and FIG. 10(b) shows a diagram in which the movement of the gas burner 2 is converted into data.

The inertial sensor 7 (see FIG. 1) is attached to the joining tool (here, the gas burner 2). As the inertial sensor 7, a gyro sensor, a geomagnetic sensor, an acceleration sensor, or the like can be used. In particular, by using a triaxial acceleration sensor having sensitivity in three directions, movements in x, y, and z directions of an orthogonal coordinate system can be captured.

As shown in FIG. 10(a), in order to keep the temperatures of the pipe members (the joining subject member 1) widely uniform, the skilled joining operator shakes the gas burner 2 to left and right to uniformly apply the torch 2a to the joining portion of the pipe members (the joining subject member 1).

FIG. 10(b) shows that a state where the gas burner 2 is shaken to left and right is converted into data based on measurement data of the inertial sensor 7. As shown in FIG. 10(b), in the measurement data of the inertial sensor 7, numerical values of left and right movements of the gas burner 2 transit in a sine wave shape with respect to the time axis (horizontal axis). More specifically, the left and right movements of the gas burner 2 have a large amplitude and a large pitch (time width) at the start of the operation, and both the amplitude and the pitch become smaller and tend to converge near a reference value as operation time elapses. In addition, left and right amplitudes are substantially equal with respect to the reference value shown in FIG. 10(b).
<Unskilled Joining Operator>

FIG. 11 illustrates diagrams showing an example of capturing a movement of the gas burner 2 used by an unskilled joining operator, unlike FIG. 10, using the inertial sensor 7, where FIG. 11(a) is a diagram showing the movement of the gas burner 2 used by the unskilled joining operator, and FIG. 11(b) shows a diagram in which the movement of the gas burner 2 is converted into data.

The above skilled joining operator shakes the gas burner 2 to left and right to keep the temperature distribution of the pipe members (the joining subject member 1) widely uniform. In addition, at the start of the operation, the amplitude and the pitch (time width) are increased, and as the operation time elapses, the amplitude and the pitch are reduced. On the other hand, as shown in FIG. 11(a), the movement of the gas burner 2 performed by the unskilled operator is biased to the left or right (the left here). Moreover, the left and right amplitude is slight and is not uniform with respect to the time axis (horizontal axis). Finally, the amplitude is biased greatly to the right side, which may be a result of consideration of insufficient heating on the right side. FIG. 11(b) shows that the measurement data of the inertial sensor 7 is biased toward a numerical value indicating a left side movement with respect to the time axis, and also many fine variations exist.

Thus, by measuring the movement of the joining tool (the gas burner 2) with the inertial sensor 7 (see FIG. 1), a motion of the joining tool (the gas burner 2) can be converted into data in time series. Accordingly, it is possible to know whether the joining tool (the gas burner 2) corresponding to the pipe members (the joining subject member 1) is handled.
<Triaxial Inertial Sensor (Skilled Operator)>

FIG. 12 illustrate diagrams showing an example of data of the movement of the tip end position of the joining tool (the tip end position of the torch 2a of the gas burner 2) using the triaxial inertial sensor 7, and are examples of data by the skilled joining operator shown in FIG. 10(a). FIGS. 12(a) to (c) are diagrams showing the movement of the tip end position of the joining tool (the tip end position of the torch 2a of the gas burner 2) used by the skilled joining operator, and FIG. 12(d) shows a diagram in which the movement of the tip end position of the torch 2a of the gas burner 2 is converted into data. A reference sign c in FIGS. 12(a), (b), and c) indicates an upward direction of the torch 2a of the gas burner 2.

The server 20 shown in FIG. 1(a) virtually reproduces the movement of the tip end position of the torch 2a in a three-dimensional space based on data in the x, y, and z directions measured by the triaxial inertial sensor 7. In addition, the server 20 displays, on a display screen 20a (see FIG. 1(b)), a trajectory of the movement of the tip end position of the torch 2a of the gas burner 2 corresponding to the brazing operation area 10 (see FIG. 1(a)). Accordingly, the trajectory of the movement of the tip end position of the torch 2a of the gas burner 2 can be analyzed corresponding to the brazing operation area 10.

In FIGS. 12(a) to 12(c), a state where the skilled joining operator, as shown in FIG. 10(a), greatly shakes the torch 2a of the gas burner 2 left and right is reproduced in the three-dimensional space. As shown by broken lines in FIGS. 12(b) and 12(c), a history of the tip end position of the torch 2a is displayed as a trajectory. By displaying the history of the tip end position of the torch 2a of the gas burner 2 as the trajectory, it is possible to visualize how the skilled operator moves the torch 2a.

FIG. 12(d) is a graph in which a transition is plotted with data in the x, y, and z directions of the tip end position of the torch 2a of the gas burner 2 with respect to the time on the horizontal axis. As shown in FIG. 12(d), in the measurement data of the triaxial inertial sensor 7, with respect to the time axis (horizontal axis), a numerical value of data in the x direction transits uniformly in a sine wave shape, and numerical values of data in the y and z directions converge to the reference value as the time elapses.
<Triaxial Inertial Sensor (Unskilled Operator)>

FIG. 13 illustrates diagrams showing an example of data of a movement of the tip end position of the joining tool (tip end position of the torch 2a of the gas burner 2), unlike FIG. 1, using the triaxial inertial sensor 7, and are examples of data of the unskilled joining operator shown in FIG. 11(a). FIGS. 13(a) to 13(c) are diagrams showing the movement of the tip end position of the joining tool (the tip end position of the torch 2a of the gas burner 2) used by the unskilled joining operator, and FIG. 13(d) shows a diagram in which the movement of the tip end position of the torch 2a of the gas burner 2 is converted into data.

In FIGS. 13(a) to 13(c), a state where the unskilled operator, as shown in FIG. 11(a), shakes the torch 2a of the gas burner 2 biased to the left side is reproduced in the three-dimensional space. As shown by broken lines in FIGS. 13(b) and 13(c), a history of the tip end position of the torch 2a is displayed as a trajectory.

FIG. 13(d) is a graph in which a transition is plotted with data in the x, y, and z directions of the tip end position of the torch 2a with respect to the time on the horizontal axis FIG. 13(d) shows that the measurement data of the triaxial inertial sensor 7 is biased toward a numerical value indicating the left side movement with respect to the time axis (horizontal axis), and also include many fine variations. Numerical values of data in the y and z directions converge to the reference value as the time elapses.

Thus, by measuring the movement of the joining tool (torch 2a of the gas burner 2) with the triaxial inertial sensor 7 (see FIG. 1), a motion of the joining tool (torch 2a of the gas burner 2) can be converted into data in time series. Accordingly, it is possible to know whether the joining tool (the torch 2a of the gas burner 2) is handled corresponding to three-dimensional positions of the pipe members (the joining subject member 1).

The data acquisition unit 110 which converts the joining operation into data has been described above with reference to FIGS. 4 to 13.

Record of Reference Data

FIG. 14 is a flowchart showing a reference data recording processing for recording data serving as a reference for the joining operation (reference data). This flow is executed by the CPU of the server constituting the data evaluation unit 120, the difference data extraction unit 130, and the abnormal location determination unit 140, for example.

First, in step S1, in the joining operation by the skilled joining operator, the joining portion of the joining subject member is imaged using the high-speed camera 4 (see FIG. 1). That is, the brazing flow image of the joining portion is imaged with the high-speed camera 4.

In step S2, in the joining operation performed by the skilled joining operator, the temperature distribution image of the joining portion of the joining subject member is acquired using the thermo camera 5 (see FIG. 1).

In step S3, the operation state data acquisition part 112 of the data acquisition unit 110 measures the distance to the brazing material holding hand using the distance sensor 6 (see FIG. 1).

In step S4, the operation state data acquisition part 112 of the data acquisition unit 110 measures the movement of the tip end position of the joining tool (the torch 2a of the gas burner 2) using the inertial sensor 7 (see FIG. 1).

In step S5, the joining phenomenon data acquisition part 111 of the data acquisition unit 110 (see FIG. 2) acquires the imaged joining portion imaged image (brazing flow image) and the temperature distribution image of the joining portion as brazing phenomenon data (joining phenomenon data).

In step S6, the operation state data acquisition part 112 of the data acquisition unit 110 (see FIG. 2) acquires data measured by the distance sensor 6 and the inertial sensor 7 as the operation state data of the joining operation (brazing operation) in the joining operation by the skilled joining operator.

In step S7, the time synchronization part 113 of the data acquisition unit 110 (see FIG. 2) performs time synchronization to make acquisition timing of the joining phenomenon data of the joining phenomenon data acquisition part 111 temporally correspond to acquisition timing of the operation state data of the operation state data acquisition part 112. Accordingly, the movement of the human hand and the movement of the torch 2a of the gas burner 2 at the time point of measurement of the brazing operation (brazing flow image and temperature distribution image of joining portion) are associated with each other.

In step S8, the data evaluation unit 120 evaluates the joining phenomenon and the joining operation state based on the joining phenomenon data and the operation state data acquired by the data acquisition unit 110, and analyzes the joining phenomenon operation state. Specifically, the data evaluation unit 120 performs time synchronization of the acquired joining phenomenon data and the acquired operation state data, and associates the acquired joining phenomenon data and the acquired operation state data with each joining operation location, so as to calculates evaluation data.

In step S9, the data range extraction part 132 of the difference data extraction unit 130 (see FIG. 2) extracts the data range at the time point corresponding to the evaluation data based on the time point associated with the operation location.

In step S10, the difference degree calculation part 134 of the difference data extraction unit 130 (see FIG. 2) records in advance, as the reference data, the ideal flow motion performed by the skilled joining operator, the reference joining motion, and the like for each extracted data range. Specifically, the difference degree calculation part 134 generates the reference data associated with each operation location by extracting the time point corresponding to the determined operation location for the reference joining operation prepared in advance when the reference data is recorded.

By executing the above flow, the reference data storage part 133 of the difference data extraction unit 130 (see FIG. 2) accumulates the reference data such as the reference joining operation and the ideal flow motion performed by the skilled joining operator for each operation location of the joining subject member.

This registration processing is executed in advance before an abnormal location presentation processing described later, and is stored in the reference data storage part 133 as the reference data.

In addition, the reference data is accumulated for each welded product corresponding to use conditions of a shape and a type of the welded product, a welding machine (resistance welding, laser welding, and friction stir welding), a processing equipment (press machine) and the like.

[Abnormal Location Presentation Processing]

FIG. 15 is a flowchart showing the abnormal location presentation processing for presenting an abnormal location of the joining portion of the joining subject member.

First, in step S11, in the joining operation by the joining operator, the joining portion of the joining subject member is imaged using the high-speed camera 4 (see FIG. 1). That is, the brazing flow image of the joining portion is imaged with the high-speed camera 4.

In step S12, in the joining operation by the joining operator, the temperature distribution image of the joining portion of the joining subject member is acquired using the thermo camera 5 (see FIG. 1).

In step S13, the operation state data acquisition part 112 of the data acquisition unit 110 measures the distance to the brazing material holding hand using the distance sensor 6 (see FIG. 1).

In step S14, the operation state data acquisition part 112 of the data acquisition unit 110 measures the movement of the tip end position of the joining tool (the torch 2a of the gas burner 2) using the inertial sensor 7 (see FIG. 1).

In step S15, the joining phenomenon data acquisition part 111 of the data acquisition unit 110 (see FIG. 2) acquires the imaged joining portion imaged image (brazing flow image) and the temperature distribution image of the joining portion as the brazing phenomenon data (joining phenomenon data).

In step S16, the operation state data acquisition part 112 of the data acquisition unit 110 (see FIG. 2) acquires data measured by the distance sensor 6 and the inertial sensor 7 as the operation state data of the joining operation (brazing operation) in the joining operation performed by the joining operator.

In step S17, the time synchronization part 113 of the data acquisition unit 110 (see FIG. 2) performs time synchronization to make acquisition timing of the joining phenomenon data of the joining phenomenon data acquisition part 111 temporally correspond to acquisition timing of the operation state data of the operation state data acquisition part 112. Accordingly, the movement of the human hand and the movement of the torch 2*a* of the gas burner 2 at the time point of measurement of the brazing operation (brazing flow image and temperature distribution image of joining portion) are associated with each other.

In step S18, the data evaluation unit 120 evaluates the joining phenomenon and the joining operation state based on the joining phenomenon data and the operation state data acquired by the data acquisition unit 110, and analyzes the joining phenomenon operation state. Specifically, the data evaluation unit 120 performs time synchronization of the acquired joining phenomenon data and the acquired operation state data, and associates the acquired joining phenomenon data and the acquired operation state data with each joining operation location, so as to calculate the evaluation data.

In step S19, the data range extraction part 132 of the difference data extraction unit 130 (see FIG. 2) extracts the data range at the time point corresponding to the evaluation data based on the time point associated with the operation location.

In step S20, the difference degree calculation part 134 of the difference data extraction unit 130 (see FIG. 2) calculates the difference degree between the data extracted by the data range extraction part 132 and the reference data recorded in the reference data storage part 133, and outputs the difference degree to the abnormal location determination unit 140 as the difference data.

In step S21, the abnormal location determination unit 140 (see FIG. 1) determines the abnormal location of the joining portion based on the difference data. Specifically, the abnormal location determination unit 140 determines that the portion having the large difference from the joining phenomenon is the abnormal location based on the threshold value set in advance for the difference degree obtained by the difference data extraction unit 130.

In step S22, the presentation unit 150 (see FIG. 2) presents the abnormal location and/or the repair operation possible time to the joining operator based on the determination result. For example, the presentation unit 150 displays the abnormal location as the error (see the reference sign a in FIG. 1(*b*)) on the display part 150*a*. In addition, the presentation unit 150 displays the repair operation possible time (operation allocation time) (see the reference sign b in FIG. 1(*b*)) on the display part 150*a*. Further, the presentation unit 150 projects light such as laser light on the abnormal location of the actual joining subject member 1 using the light projecting part 150*b* (see FIG. 2), and notifies the joining operator of the abnormal location by the projected light. Accordingly, the joining operator can quickly know the repair location.

As described above, by displaying the location having the large difference from the joining phenomenon as the abnormal location as the error (see the reference sign a in FIG. 1(*b*)), the joining operator can quickly know the repair location. In addition, by presenting the repair operation possible time, an estimation can be made whether the repair can be completed within the repair operation possible time. When the repair can be completed within the repair operation possible time, the repair is completed in the current step. When the repair cannot be completed within the repair operation possible time, for example, the repair is completed in the next step. In either case, since the operation allocation time is presented, the process time can be adjusted and the production delay can be reduced.

Here, it is preferable to change a repair instruction (for example, the repair operation possible time) according to the skill level of the operator.

As described above, the joining process line monitoring system 100 (see FIG. 2) according to the present embodiment includes the joining phenomenon data acquisition part 111 configured to acquire the joining phenomenon of the joining subject member as the phenomenon data; the operation state data acquisition part 112 configured to acquire the joining operation state of the joining subject member as the operation state data; the data evaluation unit 120 configured to perform time synchronization of the acquired phenomenon data and the acquired operation state data, and associates data with each joining operation location, so as to calculate the evaluation data; the difference data extraction unit 130 configured to extract the difference between the evaluation data and the reference data set in advance as the difference data; the abnormal location determination unit 140 configured to determine the portion having the large difference from the joining phenomenon as the abnormal location; and the presentation unit 150 configured to present the abnormal location of the joining portion of the joining subject member based on the difference data. In addition, the difference data extraction unit 130 is configured to store the reference data associated with each joining operation location for the reference joining operation prepared in advance.

As described above, the presentation unit 150 displays the abnormal location as the error (see the reference sign a in FIG. 1(*b*)) to the joining operator based on the determination result. In addition, the presentation unit 150 displays the repair operation possible time (operation allocation time) (see the reference sign b in FIG. 1(*b*)) on the display part 150*a*.

In the related art, joining result is investigated by destructive inspection and non-destructive inspection, but time is required for an inspection process and the reworking process after the defect or the incomplete portion is found. In addition, the quality lowers due to repeated heating and cooling.

On the other hand, in the present embodiment, joining quality deterioration and operation delay can be prevented by detecting an incomplete location, notifying the joining operator, and monitoring the operation of the joining operator during the joining operation.

In addition, after specifying the abnormal location, the abnormal location is presented to the joining operator, and the operation time of the joining operator is calculated, and thereby a system with good efficiency can be implemented. That is, based on data obtained by the data acquisition unit 110, it is possible to present candidates for the defect or the incomplete portion, and prevent the quality deterioration even in a joining process line in which an operator with a low skill level is arranged.

For example, by displaying the location having the large difference from the joining phenomenon as the abnormal location as the error (see the reference sign a in FIG. 1(b)) with the presentation unit 150, the joining operator can quickly know the repair location. In addition, by presenting the repair operation possible time, an estimation can be made whether the repair can be completed within the repair operation possible time. Since the operation allocation time is presented, the process time can be adjusted and the production delay can be reduced. Accordingly, it is possible to quickly recognize the defect or the incomplete portion, and to prevent the quality deterioration and the operation delay.

In addition, by projecting light on the abnormal location using the light projecting part 150b (see FIG. 2), and notifying the joining operator of the abnormal location with the projected light with the presentation unit 150, the joining operator can quickly know the repair location.

Second Embodiment

FIG. 16 is a block diagram showing a configuration of a joining process line monitoring system according to a second embodiment of the invention. The same components as those in FIG. 2 are denoted by the same reference signs, and description of repeated locations is omitted.

As shown in FIG. 16, a joining process line monitoring system 200 includes the data acquisition unit 110, a data evaluation unit 220 (evaluation data calculation unit), a joining phenomenon operation state analysis part 230, and the difference data extraction unit 130.

<Data Evaluation Unit 220>

The data evaluation unit 220 includes a joining phenomenon data evaluation part 221 and an operation state data evaluation part 222.

The joining phenomenon data evaluation part 221 includes a video data time point evaluation part 2211, a flow location extraction part 2212, and a temperature distribution evaluation part 2213.

The video data time point evaluation part 2211 performs time point association of video data of the high-speed camera 4 and video data of the thermo camera 5.

The flow location extraction part 2212 extracts a flow location of the molten metal material from the video data of the high-speed camera 4 based on the video data of the joining portion.

The temperature distribution evaluation part 2213 evaluates the temperature distribution of the joining portion based on the video data of the thermo camera 5 and the flow location extraction part 2212. That is, whether the acquired temperature distribution is an evaluation target as significant phenomenon data is evaluated.

The operation state data evaluation part 222 includes a trend data time point evaluation part 2221, an operation procedure extraction part 2222, and a joining tool motion extraction part 2223.

The trend data time point evaluation part 2221 performs time point association of trend data which is a transient characteristic of the measurement data of the distance sensor 6 (see FIG. 1) and trend data which is a transient characteristic of the measurement data of the inertial sensor 7 (see FIG. 1).

The operation procedure extraction part 2222 generates operation procedure extraction data obtained by extracting an operation procedure for the joining portion from the trend data of the distance sensor 6.

The joining tool motion extraction part 2223 generates joining tool motion extraction data obtained by extracting a joining tool motion from the trend data of the inertial sensor 7.

In the present embodiment, when the joining phenomenon data acquisition part 111 of the data acquisition unit 110 includes the high-speed camera 4 (see FIG. 1) that images a video of a change in the joining portion and the thermo camera 5 (see FIG. 1) that measures a temperature distribution change corresponding to the video, the difference data extraction unit 130 can extract difference data of a flow location of the molten metal material in the joining portion based on the video and the temperature distribution.

<Joining Phenomenon Operation State Analysis Part 230>

The joining phenomenon operation state analysis part 230 synthesizes joining phenomenon evaluation data of the joining phenomenon data evaluation part 221 and evaluation data of the operation state data evaluation part 222 to perform an analysis in which a phenomenon and an operation process correspond with each other on the time axis.

The analysis corresponding on the time axis has a correspondence relationship between a position, a motion direction, and a motion speed of the joining tool (burner) and the temperature distribution. In addition, another analysis besides the analysis corresponding on the time axis focuses on a correspondence relationship between the position, the motion direction, and the motion speed of the joining tool (burner) and a status of the brazing flow.

The joining phenomenon operation state analysis part 230 includes a joining phenomenon data and operation state correspondence data generation part 2231, a joining condition storage part 2232, and a comparison part 2233.

The joining phenomenon data and operation state correspondence data generation part 2231 synthesizes the joining phenomenon evaluation data of the joining phenomenon data evaluation part 221 and evaluation data of the operation state data evaluation part 222 to generate joining phenomenon data and operation state correspondence data.

The joining condition storage part 2232 stores a reference joining condition corresponding to the joining phenomenon data and operation state correspondence data.

The comparison part 2233 compares the generated joining phenomenon data and operation state correspondence data with the joining condition, and outputs a comparison result to the difference data extraction unit 130.

Hereinafter, a joining process line monitoring method of the joining process line monitoring system 200 configured as described above will be described.

A basic motion of the joining process line monitoring system 200 is the same as that of the joining process line monitoring system 100 of the first embodiment.

A motion of the data evaluation unit 220 is characteristic.

FIGS. 17 and 18 illustrate diagrams showing the joining phenomenon data evaluation part 221 of the data evaluation unit 220.

FIG. 17 illustrates diagrams showing an example of extraction of the flow location of the flow location extraction part 2212 of the joining phenomenon data evaluation part 221. FIG. 17(a) shows an example of joining the joining portion of the pipe member 1a and the pipe member 1b to be joined by applying brazing with the molten metal material 3. FIGS. 17(b) to 17(g) shows enlarged views of a main part of a portion surrounded by the broken line in FIG. 17(a), and shows a state where a trajectory of the brazing flow is extracted for each image (frame) imaged by the high-speed camera 4 (see FIG. 1).

As shown in FIGS. 17(b) to 17(g), in the brazing flow, an image is recorded as a changed portion in each image of the joining portion. In this example, at a time point of measurement of a start of the brazing operation shown in FIG. 17(b), the molten metal material 3 is not melted. At a time point of measurement shown in FIG. 17(c), the melted molten metal material 3a is brazed to the joining portion, and at a time point of measurement shown in FIG. 17(d), the melted molten metal material 3a is brazed to the joining portion over the entire circumference. The flow location extraction part 2212 extracts a changed portion by temporally calculating a difference from an image that is at least one frame before in advance.

The flow location extraction part 2212 identifies a position by detecting a threshold value of the changed portion or by image recognition using a pattern image.

FIG. 17(e) corresponds to FIG. 17(b), FIG. 17(f) corresponds to FIG. 17(c), and FIG. 17(g) corresponds to FIG. 17(d). Portions surrounded by broken lines in FIGS. 17(e) to 17(g) each indicate a tip end of the molten metal material 3.

As shown in FIGS. 17(e) to 17(g), the flow location extraction part 2212 extracts changed portions of the molten metal material 3 to convert the trajectory of the brazing flow into data. In addition, by extracting the tip end of the molten metal material 3, it is possible to learn information on a position where the tip end of the molten metal material 3 becomes a joining start point. Obtaining information on the position where the tip end of the molten metal material 3 becomes the joining start point is effective for evaluating a temperature status at a tip end portion of the molten metal material described below. As shown in FIGS. 17(d) and 17(e), the fillet-shaped molten metal material 3a is obtained over the entire joining line L (entire circumference) of the joining portion.

FIG. 18 illustrates diagrams showing an example of a temperature distribution of the temperature distribution evaluation part 2213 of the joining phenomenon data evaluation part 221 (see FIG. 16). FIG. 18(a) shows a temperature distribution in which the temperature of the pipe member 1b and the temperature of the pipe member 1a are low and heating is insufficient, and FIG. 18(b) shows a temperature distribution in which the temperature of the pipe member 1b is higher than the temperature of the pipe member 1a, the outer edge portion 1b1 of the pipe member 1b is sufficiently heated over the entire circumference, and appropriate heating is performed also for the pipe member 1a. FIGS. 18(c) to 18(e) shows enlarged views of a main part of a portion surrounded by the broken line in FIG. 18(b) at each time of the brazing operation.

As shown in FIG. 18(a), the temperature distribution evaluation part 2213 (see FIG. 16) knows a temperature of an entire member and evaluates a temperature change around the molten metal material (see FIG. 18(b)). At this time, as shown in FIG. 18(c), the flow location extraction part 2212 (see FIG. 16) evaluates whether the temperature is an appropriate condition using information on a position around the tip end of the extracted molten metal material.

Thus, the joining phenomenon data evaluation part 221 generates data for analyzing a flow phenomenon and a temperature condition for the brazing flow.

FIG. 19 illustrates diagrams showing an example of the operation procedure extraction part 2222 of the operation state data evaluation part 222 (see FIG. 16). FIG. 19 shows a state where the operation procedure extraction part 2222 uses the distance sensor 6 (see FIG. 1) to evaluate positions and postures in the operation area and convert operation locations and an order of the operation locations into data.

FIG. 19(a) represents an operation location A and an operation location B of the pipe members (the joining subject member 1) of the joining operator, and FIG. 19(b) schematically shows the joining locations (operation location) of FIG. 19(a). FIG. 19(c) represents the operation location A and the operation location B of the pipe members (the joining subject member 1) when the joining operator moves, and FIG. 19(d) schematically shows the joining locations of FIG. 19(c). FIG. 19(e) represents joining operations at the joining location A and the joining location B of the pipe members (the joining subject member 1) after the joining operator has moved, and FIG. 19(f) schematically shows the joining locations of FIG. 19(e).

FIG. 19 shows a state where the joining operator holds the joining tool (the gas burner 2) by a right hand, and holds the molten metal material 3 by a left hand to apply the brazing for the joining subject member 1.

In FIG. 19(a), the body of the joining operator is in a position close to the operation location A of the pipe members (the joining subject member 1). As described above, the operation state data acquisition part 112 of the data acquisition unit 110 (see FIG. 2) converts the movement (posture) of the body of the joining operator from the skeleton information with the distance sensor 6 (see FIG. 1) into data. The data evaluation unit 220 evaluates the posture of the joining operator to be in the joining operation. Here, it is recognized that the operation is performed at the joining location A shown in FIG. 19(b) currently.

As shown in FIG. 19(c), when the joining operator completes the brazing operation at the operation location A and opens the arms while moving to the operation location B, the postures are evaluated to be not in the operation, and it is recognized that the body of the joining operator does not belong to any joining location as shown in FIG. 19(d).

As shown in FIG. 19(e), when the body of the joining operator in a position close to the next operation location B of the pipe members (the joining subject member 1), the operation state data acquisition part 112 converts the movement (posture) of the body of the joining operator from the skeleton information with the distance sensor 6 (see FIG. 1) into data. The data evaluation unit 220 evaluates the posture of the joining operator to be in the joining operation. Here, it is recognized that the operation is performed at the joining location B shown in FIG. 19(f) currently. At this time, the order of the operation locations is organized with an operation time point at the joining location A and an operation time point at the joining location B, and is controlled as an operation record at the joining locations.

FIG. 20 illustrates diagrams showing an example of data of a movement of the tip end position of the joining tool (the tip end position of the torch 2a of the gas burner 2) using the triaxial inertial sensor 7, and are examples of data by the skilled joining operator shown in FIG. 19. The reference sign c in FIGS. 20(b) and 20(f) indicates the upward direction of the torch 2a of the gas burner 2.

FIG. 20(a) corresponds to FIG. 19(b), and FIG. 20(b) shows a case where it is recognized that the operation is performed at the operation location A shown in FIG. 19(b). FIG. 20(e) corresponds to FIG. 19(f), and FIG. 20(f) shows a movement of the tip end position of the joining tool (the tip end position of the torch 2a of the gas burner 2) used by the joining operator when it is recognized that the operation is performed at the joining location B shown in FIG. 19(f).

FIG. 20(c) corresponds to FIG. 19(d), and FIG. 20(d) shows a case where the body of the joining operator is recognized as not belonging to any joining location shown in FIG. 19(d). FIG. 20(e) corresponds to FIG. 19(f), and FIG. 20(f) shows a movement of the tip end position of the joining tool (the tip end position of the torch 2a of the gas burner 2) used by the joining operator when it is recognized that the operation is performed at the joining location B shown in FIG. 19(e).

The operation procedure extraction part 2222 shown in FIG. 16 can represent a three-dimensional trajectory of the burner (torch) for the joining location evaluated as in the operation. Accordingly, the operation process for each joining location can be organized.

Application Example

The joining process line monitoring system 100 (200) can also be linked to a manufacturing execution system (MES) via a programmable logic controller (PLC). The manufacturing execution system (MES) controls an entire production system of a part processing process, a part assembly process, this joining process line monitoring system 100 (200), and an inspection process connected via each PLC according to a production plan. The manufacturing execution system (MES) links information of factory sub-processes and evaluates the production plan. By applying this joining process line monitoring system 100 (200) to a joining operation process, it is possible to more accurately and quickly know the operation status and defect information of a joining line. By receiving information from this joining process line monitoring system 100 (200), the manufacturing execution system (MES) can control an operation status of a production line and preliminarily reduce the production delay and the quality deterioration. It is also possible to evaluate and review the production plan. For example, delay information or reworking information is passed to a subsequent process to give an operation instruction corresponding to the operation status and the defect information of the joining line. In particular, in an inspection process of the subsequent process, a priority item for inspection is instructed so that an inspector can efficiently perform the inspection. In addition, it is possible to present a maintenance instruction for a facility and a necessity of planning corresponding to the operation status and the defect information of the joining line. Further, by using the operation status and the defect information, the skill level of the operator is evaluated and accumulated as data, and it is possible to allocate an arrangement of the operators according to the production plan and contents in MES.

The invention is not limited to the above embodiments, and includes other modifications and application examples without departing from the gist of the invention described in the claims. For example, the joining process is not limited to brazing.

In addition, for example, a part of the configuration of a certain embodiment can be replaced with the configuration of another embodiment, and the configuration of another embodiment can be added to the configuration of the certain embodiment. In addition, it is possible to add, delete, and replace other configurations for a part of the configuration of each embodiment.

In addition, those indicated above are control lines and information lines that are considered necessary for the description, and not all the control lines and the information lines are necessarily shown as the product. In practice, it may be considered that almost all configurations are connected to one another.

REFERENCE SIGN LIST 100, 200: joining process line monitoring system
1: joining subject member
1a, 1b: pipe member (joining subject member)
2: gas burner (joining tool)
2a: torch (burner flame) (joining tool)
4: high-speed camera (joining phenomenon data acquisition unit)
5: thermo camera (joining phenomenon data acquisition unit)
6: distance sensor (operation state data acquisition unit)
7: inertial sensor (operation state data acquisition unit)
20: server
20a, 150a: display part (presentation unit)
100: joining process line monitoring system
110: data acquisition unit
111: joining phenomenon data acquisition part
112: operation state data acquisition part
113: time synchronization part
120, 220: data evaluation unit (evaluation data calculation unit)
121: joining phenomenon data evaluation part
122: operation state data evaluation part
123: joining phenomenon operation state analysis part
130: difference data extraction unit
131: operation location determination part
132: data range extraction part
133: reference data storage part (reference data storage unit)
134: difference degree calculation part
140: abnormal location determination unit
150: presentation unit
150b: light projecting part (presentation unit)
221: joining phenomenon data evaluation part
  2211: video data time point evaluation part
  2212: flow location extraction part
  2213: temperature distribution evaluation part
222: operation state data evaluation part
  2221: trend data time point evaluation part
  2222: operation procedure extraction part
  2223: joining tool motion extraction part
230: joining phenomenon operation state analysis part
  2231: joining phenomenon data and operation state correspondence data generation part
  2232: joining condition storage part
  2233: comparison part

The invention claimed is:
1. A joining process line monitoring system comprising:
a one or more cameras configured to acquire a joining phenomenon of a joining subject member as phenomenon data;
a one or more sensors configured to acquire a joining operation state of the joining subject member as operation state data;
at least one memory configured to store a program and to store reference data associated with each joining operation location for a joining operation prepared as a reference that is set in advance, wherein the reference data is stored corresponding to a skill level of an operator;
a central processing unit (CPU) coupled to the at least one memory, the CPU configured to execute the program to:
  perform time synchronization of the acquired phenomenon data and the acquired operation state data, and associate the acquired phenomenon data and the acquired operation state data with each joining operation location, so as to calculate evaluation data;

extract a difference between the evaluation data and the reference data set in advance as difference data;

determine an abnormal location of a joining portion by comparing a degree of difference and a threshold value based on the difference data;

calculate time required to repair the abnormal location of the joining portion according to the skill level of the operator stored in the at least one memory, and designate the calculated time as a repair operation possible time, which is the allocated time for repairing the abnormal location of the joining portion; and a display configured to present the abnormal location of the joining portion of the joining subject member based on the difference data and present the repair operation possible time to the operator when presenting the abnormal location of the joining portion, wherein, if repair of the abnormal location cannot be completed within the repair operation possible time based on the skilled level of the operator, the CPU is further configured to notify other personnel that the repair cannot be completed within the allocated time.

2. The joining process line monitoring system according to claim 1, wherein the one or more cameras include:

a camera configured to image the joining portion; and a thermo camera configured to measure a temperature distribution of the joining portion.

3. The joining process line monitoring system according to claim 1, wherein the one or more sensors include:

a distance sensor configured to measure distances to each part of a joining operation; and a movement sensor configured to measure a movement of a joining tool.

4. The joining process line monitoring system according to claim 1, wherein one or more cameras include a camera configured to image a video of a change in the joining portion, one or more sensors includes a thermo camera configured to measure a temperature distribution change corresponding to the video, and the CPU is further configured to execute the program to extract the difference data of a flow location of a molten metal material in the joining portion based on the video and the temperature distribution change of the video.

5. The joining process line monitoring system according to claim 1, wherein the display is configured to present the abnormal location by projecting light indicating the abnormal location on the joining portion.

6. The joining process line monitoring system according to claim 1, wherein the display is configured to present an operation allocation time allocated to repair the abnormal location.

* * * * *